US007080367B2

(12) United States Patent
Takayama et al.

(10) Patent No.: US 7,080,367 B2
(45) Date of Patent: *Jul. 18, 2006

(54) PROCESSOR FOR EXECUTING INSTRUCTIONS IN UNITS THAT ARE UNRELATED TO THE UNITS IN WHICH INSTRUCTIONS ARE READ, AND A COMPILER, AN OPTIMIZATION APPARATUS, AN ASSEMBLER, A LINKER, A DEBUGGER AND A DISASSEMBLER FOR SUCH PROCESSOR

(75) Inventors: Shuichi Takayama, Takarazuka (JP); Hajime Ogawa, Neyagawa (JP); Kenichi Kawaguchi, Kobe (JP); Nobuo Higaki, Osaka (JP); Kensuke Odani, Kyoto (JP); Tetsuya Tanaka, Ibaraki (JP); Shinya Miyaji, Hirakata (JP); Taketo Heishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 561 days.

This patent is subject to a terminal disclaimer.

(21) Appl. No.: 10/051,335

(22) Filed: Oct. 19, 2001

(65) Prior Publication Data
US 2002/0073407 A1 Jun. 13, 2002

Related U.S. Application Data

(62) Division of application No. 09/301,284, filed on Apr. 28, 1999, now Pat. No. 6,880,150.

(30) Foreign Application Priority Data
Apr. 28, 1998 (JP) .................................. 10-118326

(51) Int. Cl.
*G06F 9/45* (2006.01)
(52) U.S. Cl. ...................................... 717/151; 717/161

(58) Field of Classification Search ........ 717/151–161, 717/138; 712/230, 34, 23, 24, 201, 233; 703/21; 718/102
See application file for complete search history.

(56) References Cited
U.S. PATENT DOCUMENTS
4,040,035 A 8/1977 Bennett et al.
(Continued)

FOREIGN PATENT DOCUMENTS
EP 0 423 726 4/1991
(Continued)

OTHER PUBLICATIONS

Chau-Wen Tseng, Compiler optimizations for eliminating barrier synchronization, Aug. 1995, ACM SIGPLAN Notices, Proceedings of the fifth ACM SIGPLAN symposium on Principles and practice of parallel programming, vol. 30 Issue 8, pp. 144-155.*
(Continued)

Primary Examiner—Wei Zhen
Assistant Examiner—Satish S. Rampuira
(74) Attorney, Agent, or Firm—McDermott Will & Emery LLP

(57) ABSTRACT

When a branch instruction is decoded by the instruction decoders 409a~409c, the upper 29 bits of the PC relative value included in the branch instruction are sent to the upper PC calculator 411 and the lower 3 bits are sent to the lower PC calculator 405. The lower PC calculator 405 adds the lower 3 bits of the PC relative value and the lower 3 bits of the present lower PC 404 and sends the result to the lower PC 404 as the updated lower PC. The upper PC calculator 411 adds the upper 29 bits of the PC relative value, the upper 29 bits of the present upper PC 403, and a carry that may be received from the lower PC calculator 405, and sends the result to the upper PC 403 as the updated upper PC.

5 Claims, 40 Drawing Sheets

U.S. PATENT DOCUMENTS

| | | | |
|---|---|---|---|
| 5,179,702 A * | 1/1993 | Spix et al. | 718/102 |
| 5,218,711 A * | 6/1993 | Yoshida | 712/34 |
| 5,226,131 A * | 7/1993 | Grafe et al. | 712/201 |
| 5,475,822 A | 12/1995 | Sibigtroth et al. | |
| 5,559,975 A * | 9/1996 | Christie et al. | 712/230 |
| 5,740,447 A | 4/1998 | Kurahashi | |
| 5,819,081 A | 10/1998 | Nanba | |
| 5,842,017 A * | 11/1998 | Hookway et al. | 717/158 |
| 5,896,521 A * | 4/1999 | Shackleford et al. | 703/21 |
| 5,905,893 A * | 5/1999 | Worrell | 717/151 |
| 6,032,252 A * | 2/2000 | Petro et al. | 712/233 |
| 6,038,660 A * | 3/2000 | Singh et al. | 712/230 |
| 6,088,779 A | 7/2000 | Bharadhwaj | |
| 6,091,897 A * | 7/2000 | Yates et al. | 717/138 |
| 6,226,789 B1 * | 5/2001 | Tye et al. | 717/138 |
| 6,834,336 B1 * | 12/2004 | Takayama et al. | 712/24 |
| 2001/0042189 A1* | 11/2001 | Babaian et al. | 712/23 |
| 2004/0215940 A1* | 10/2004 | Heishi et al. | 712/221 |

FOREIGN PATENT DOCUMENTS

| | | |
|---|---|---|
| EP | 0 472 025 | 2/1992 |
| EP | 0 652 510 | 5/1995 |
| EP | 1338957 A2 * | 8/2003 |
| JP | 6242237 | 2/1987 |
| JP | 3-48334 | 3/1991 |
| JP | 3-152624 | 6/1991 |
| JP | 4-40525 | 2/1992 |
| JP | 5-289870 | 11/1993 |
| WO | WO 96 08762 | 3/1996 |

OTHER PUBLICATIONS

Lynn et al., Compiler and hardware support for cache coherence in large-scale multiprocessors: design considerations and performance study, May 1996, ACM SIGARCH Computer Architecture News, vol. 24 Issue 2, pp. 283-294.*

Ando et al., Unconstrained speculative execution with predicated state buffering, IEEE, Jun. 22-24, 1995 pp. 126-137.*

Akkary et al., A dynamic multithreading processor, IEEE, Nov. 30-Dec. 2, 1998 pp. 226-236.*

Spohrer T., et al.: "Combination PC/Line Prefetch Address Adder" Motorola Technical Developments, Motorola Inc. ,vol. 13, Jul. 1, 1991, pp. 20-21.

Eda, Hiroki. "News Reports: Intel and HP Unveiled Outline of Their Next Instruction Set "IA-64"" Nikkei Electronics (Nikkei Business Publications. Inc.) Nov. 3, 1997, No. 702, pp. 27-28.

Kumagai, Masayasu. "Chapter 4, Next Generation Pentium and Competing Processors, Details of VLIW and IA-64, and Comparisons with Alpha and PowerPC." Interface (CQ Publishing Co., Ltd.) Mar. 1, 1998, vol. 24, No. 3, pp. 132-139.

* cited by examiner

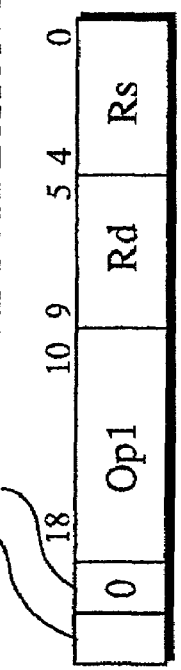
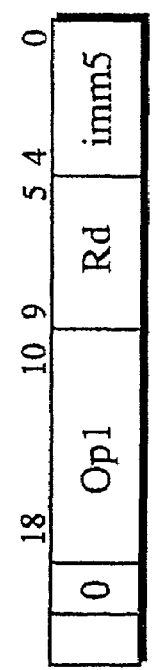
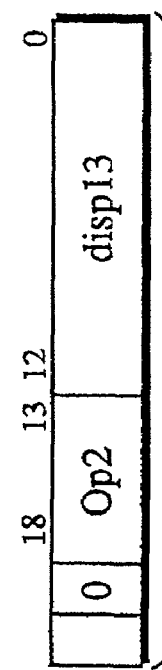
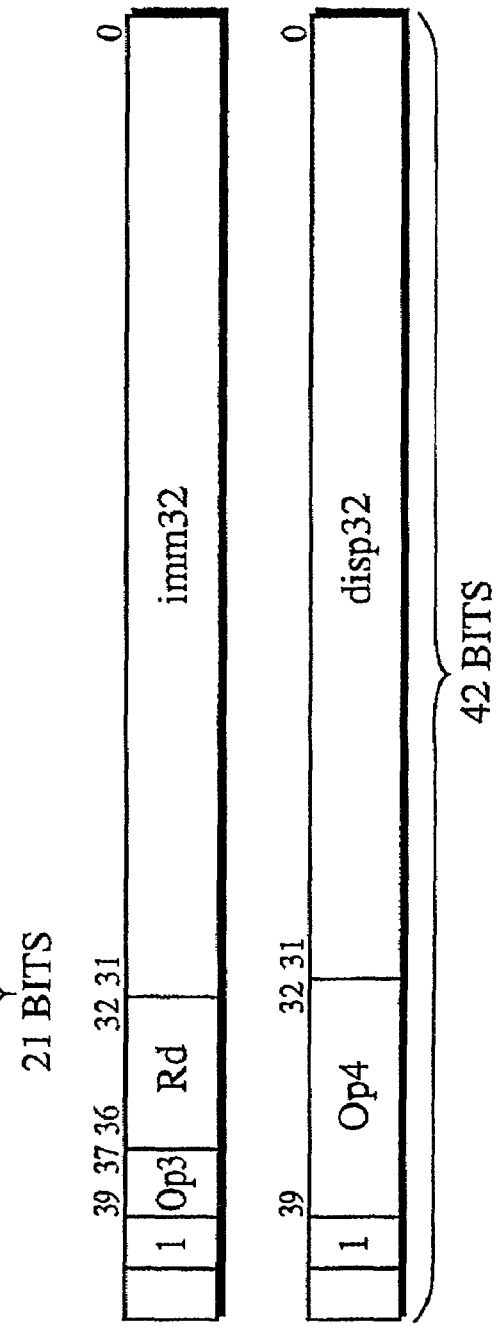
FIG. 2A  FIG. 2B  FIG. 2C  FIG. 2D  FIG. 2E

FIG. 7

| IN-PACKET ADDRESS BEFORE UPDATING / INCREMENT VALUE | 3'b000 | 3'b010 | 3'b100 |
|---|---|---|---|
| 1 | 3'b010 | 3'b100 | 3'b000 (CARRY 1) |
| 2 | 3'b100 | 3'b000 (CARRY 1) | 3'b010 (CARRY 1) |
| 3 | 3'b000 (CARRY 1) | 3'b010 (CARRY 1) | 3'b100 (CARRY 1) |
| 4 | 3'b010 (CARRY 1) | 3'b100 (CARRY 1) | 3'b000 (CARRY 2) |

FIG. 8A

| LOWER 3 BITS OF PC RELATIVE VALUE \ LOWER 3 BITS OF ADDRESS VALUE | 3'b000 | 3'b010 | 3'b100 |
|---|---|---|---|
| 3'b000 | 3'b000 | 3'b010 | 3'b100 |
| 3'b010 | 3'b010 | 3'b100 | 3'b000 (CARRY 1) |
| 3'b100 | 3'b100 | 3'b000 (CARRY 1) | 3'b010 (CARRY 1) |

FIG. 8B

| LOWER 3 BITS OF ADDRESS VALUE (BEFORE SUBTRACTION) \ LOWER 3 BITS OF ADDRESS VALUE (TO BE SUBTRACTED) | 3'b00 | 0b010 | 0b100 |
|---|---|---|---|
| 3'b000 | 3'b000 | 3'b100 (CARRY 1) | 3'b010 (CARRY 1) |
| 3'b010 | 3'b010 | 3'b000 | 3'b100 (CARRY 1) |
| 3'b100 | 3'b100 | 3'b010 | 3'b000 |

FIG. 11

```
L1:  mov r2, r1      · · 1000
     jsr f           · · 1001
     add r0, r4      · · 1002
     and r1, r3      · · 1003
     mov L2, r2      · · 1004
     ld (r2), r0     · · 1005
     bra L1          · · 1006
     add r2, r3      · · 1007
...
L2:  ...             · · 1008
```

FIG. 12

| | | |
|---|---|---|
| 32'h00000800 | L1:  mov r2, r1 | · · 1000 |
| 32'h00000802 | jsr f | · · 1001 |
| 32'h00000804 | add r0, r4 | · · 1002 |
| 32'h00000808 | and r1, r3 | · · 1003 |
| 32'h0000080a | mov L2, r2 | · · 1004 |
| 32'h00000810 | ld (r2), r0 | · · 1005 |
| 32'h00000812 | bra L1 | · · 1006 |
| 32'h00000814 | add r2, r3 | · · 1007 |
| | ... | |
| 32'h12345678 | L2:  ... | · · 1008 |

FIG. 13

| INSTRUCTION | RESOLVING VALUE | |
|---|---|---|
| mov L2, r2 | ADDRESS | 32'h12345678 |
| bra L1 | PC RELATIVE VALUE | 32'h00000800-32'h00000812 |

FIG. 14

```
L1:    mov r2, r1   ||   jsr f          ||   add r0, r4      · · 1300
       and r1, r3   ||   mov L2, r2    ||   (mov L2, r2)    · · 1301
       ld (r2), r0  ||   bra L1         ||   add r2, r3       · · 1302
       ...
L2:                                                           · · 1303
```

FIG. 17

| | | | | ···1400 |
|---|---|---|---|---|
| 29'h00000000 | L1: | mov r2,r1 ···1401 | jsr f ···1402 | add r0, r4 ···1403 |
| 29'h00000001 | | and r1,r3 ···1405 | mov L2, r2 ···1406 | ···1404 |
| 29'h00000002 | | ld (r2), r0 ···1408 | bra L1 ···1409 | add r2, r3 ···1410 ···1407 |
| | ··· | | | |
| 29'h02468acf | L2: | | | ···1411 |

FIG. 18

| INSTRUCTION | RESOLVING VALUE |
|---|---|
| bra L1 | PC RELATIVE VALUE  32'h00000000-32'h00000012 |

FIG. 19

| | PARALLEL EXECUTION BOUNDARY INFORMATION | BIT FORMAT INFORMATION | | | UNUSED BIT AREA |
|---|---|---|---|---|---|
| 29'h00000000 | 0;0; | L1: mov r2, r1 ···1601 | 1;0; jsr f  ···1602 | 0;0; add r0, r4 ···1603 | 0 ···1600 |
| 29'h00000001 | 0;0; | and r1, r3 ···1605 | 1;1; mov L2, r2 ···1606 | | 0 ···1604 |
| 29'h00000002 | 0;0; | ld (r2), r0 ···1608 | 1;0; bra 13'h1fec···1609 | 0;0; add r2, r3 ···1610 | 0 ···1607 |
| ... | | ... | | | |
| 29'h02468acf | | L2: | | | 0 ···1611 |

FIG. 22

| 29'h00000000 | 0:0:f: | ret | ...1701 | 0:0: | nop | ...1702 | 1:0: | nop | ...1703 | 0 |

| 29'h00000000 | 0;0;f: | ret | ...1801 | 0;0;nop | ...1802 | 1;0; nop | ...1803 | 0 ...1800 |
|---|---|---|---|---|---|---|---|---|
| 29'h00000001 | 0;0;L1: | mov r2, r1 | ...1805 | 1;0;jsr f | ...1806 | 0;0; add r0, r4 | ...1807 | 0 ...1804 |
| 29'h00000002 | 0;0; | and r1, r3 | ...1809 | 1;1;mov L2, r2 | ...1810 | 0 | | 0 ...1808 |
| 29'h00000003 | 0;0; | ld (r2), r0 | ...1812 | 1;0;bra 13'h1fec | ...1813 | 0;0; add r2, r3 | ...1814 | 0 ...1811 |
| ... | | | | | | | | |
| 29'h02468ad0 | L2: | | ... | | | | | 0 ...1815 |

FIG. 24

| | | | | | | | | |
|---|---|---|---|---|---|---|---|---|
| 29'h00000000 | 0;0; | f: | | ret | ...1901 | 0;0; | nop | ...1902 | 1;0; | nop | ...1903 | 0 ...1900 |
| 29'h00000001 | 0;0; | L1: | mov r2, r1 | ...1905 | 1;0; | jsr f | ...1906 | 0;0; | add r0, r4 | ...1907 | 0 ...1904 |
| 29'h00000002 | 0;0; | | and r1, r3 | ...1909 | 1;1; | mov 32'h12345680, r2 | | ...1910 | 0 ...1908 |
| 29'h00000003 | 0;0; | | ld (r2), r0 | ...1912 | 1;0; | bra 13'h1fec | ...1913 | 0;0; | add r2, r3 | ...1914 | 0 ...1911 |
| ... | | | | | | | | |
| 29'h02468ad0 | L2: | | | | | | | 0 ...1915 |

FIG. 25

| INSTRUCTION | RESOLVING VALUE |
|---|---|
| jsr f | PC RELATIVE VALUE 32'h00000000-32'h0000000a |

FIG. 26

| | | | | | | |
|---|---|---|---|---|---|---|
| 29'h00000000 | 0:0: | f: | ret ···2101 | ···2102 | 0:0: nop ···2103 | 0 ···2100 |
| 29'h00000001 | 0:0: | L1: | mov r2, r1 ···2105 | ···2106 | 1:0: add r0, r4 ···2107 | 0 ···2104 |
| 29'h00000002 | 0:0: | | and r1, r3 ···2109 | 1:1: mov 32'h12345680, r2 ···2110 | 0:0: | 0 ···2108 |
| 29'h00000003 | 0:0: | | ld (r2), r0 ···2112 | 1:0: bra 13'h1fec ···2113 | 0:0: add r2, r3 ···2114 | 0 ···2111 |
| ... | | | | | | |
| 29'h02468ad0 | | L2: | | | | 0 ···2115 |

FIG. 27

| | | | | | | | | |
|---|---|---|---|---|---|---|---|---|
| 29'h00000000 | 0;0 | f: | ret | ...2201 | ...2202 | 0;0;nop | ...2203 | 0 ...2200 |
| 29'h00000001 | 0;0 | L1: | mov r2, r1 | ...2205 | 1;0;jsr 13'h1ff8 ...2206 | 1;0; nop | ...2207 | 0 ...2204 |
| 29'h00000002 | 0;0 | | and r1, r3 | ...2209 | 1;1;mov 32'h12345680, r2 ...2210 | 0;0; add r0, r4 | | 0 ...2208 |
| 29'h00000003 | 0;0 | | ld (r2), r0 | ...2212 | 1;0;bra 13'h1ff0 ...2213 | 0;0; add r2, r3 | ...2214 | 0 ...2211 |
| ... | | | | | ... | | | |
| 29'h02468ad0 | | L2: | | | | | | 0 ...2215 |

FIG. 28A
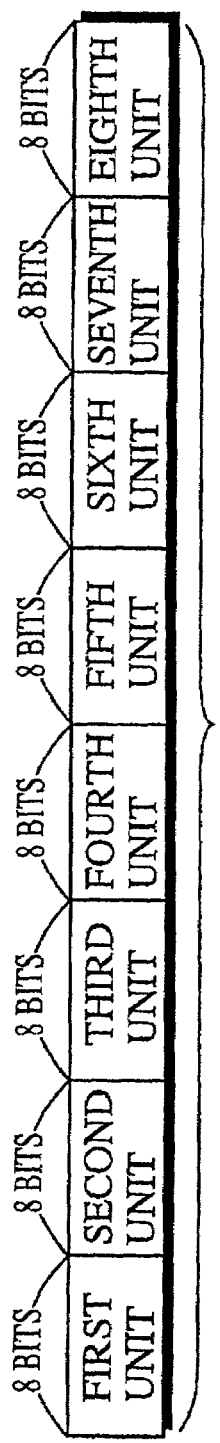
FIG. 28B
2-UNIT INSTRUCTION
3-UNIT INSTRUCTION
5-UNIT INSTRUCTION
6-UNIT INSTRUCTION
FIG. 28C
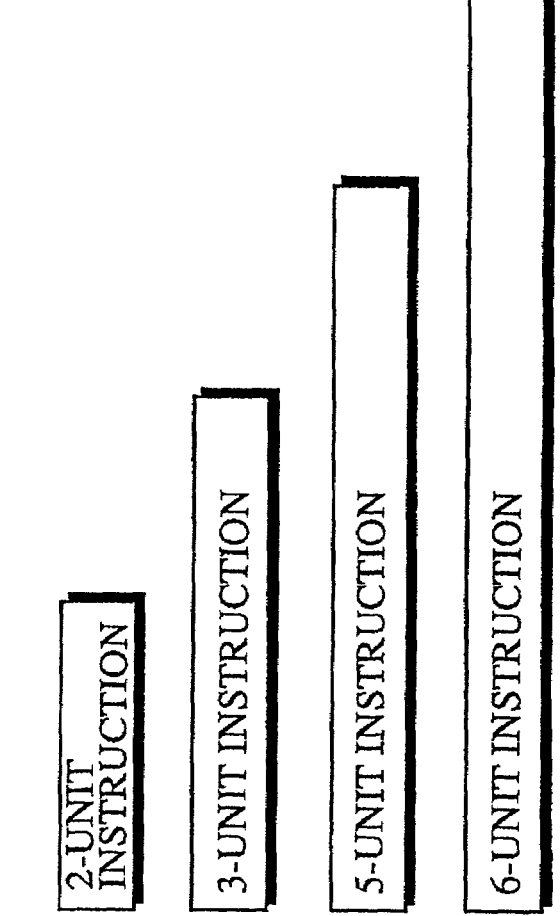
| IN-PACKET ADDRESS | UNIT |
|---|---|
| 3'b000 | FIRST UNIT |
| 3'b001 | SECOND UNIT |
| 3'b010 | THIRD UNIT |
| 3'b011 | FOURTH UNIT |
| 3'b100 | FIFTH UNIT |
| 3'b101 | SIXTH UNIT |
| 3'b110 | SEVENTH UNIT |
| 3'b111 | EIGHTH UNIT |

FIG. 29A

| LOWER 3 BITS OF PC RELATIVE VALUE \ LOWER 3 BITS OF ADDRESS VALUE | 3'b000 | 3'b010 | 3'b100 |
|---|---|---|---|
| 3'b000 | 3'b000 | 3'b010 | 3'b100 |
| 3'b010 | 3'b010 | 3'b100 | 3'b000 (CARRY IGNORED) |
| 3'b100 | 3'b100 | 3'b000 (CARRY IGNORED) | 3'b010 (CARRY IGNORED) |

FIG. 29B

| LOWER 3 BITS OF ADDRESS VALUE (BEFORE BE SUBTRACTION) \ LOWER 3 BITS OF ADDRESS VALUE (TO BE SUBTRACTED) | 3'b000 | 3'b010 | 3'b100 |
|---|---|---|---|
| 3'b000 | 3'b000 | 3'b100 (CARRY IGNORED) | 3'b010 (CARRY IGNORED) |
| 3'b010 | 3'b010 | 3'b000 | 3'b100 (CARRY IGNORED) |
| 3'b100 | 3'b100 | 3'b010 | 3'b000 |

FIG. 30

| | | | | | | | | |
|---|---|---|---|---|---|---|---|---|
| 29'h00000000 | 0:0:f: | ret | ···2401 | 0:0;nop | ···2402 | 1:0; nop | ···2403 | 0 ···2400 |
| 29'h00000001 | 0:0:L1: | mov r2, r1 | ···2405 | 1:0;jsr 13'h1ffc | ···2406 | 0:0; add r0, r4 | ···2407 | 0 ···2404 |
| 29'h00000002 | 0:0; | and r1, r3 | ···2409 | 1:1;mov 32'h12345680, r2 | | | ···2410 | 0 ···2408 |
| 29'h00000003 | 0:0; | ld (r2), r0 | ···2412 | 1:0;bra 13'h1ff4 | ···2413 | 0:0; add r2, r3 | ···2414 | 0 ···2411 |
| ... | | | | | | | | |
| 29'h02468ad0 | L2: | | | | | | | 0 ···2415 |

FIG. 31A

| LOWER 3 BITS OF PC RELATIVE VALUE \ LOWER 3 BITS OF ADDRESS VALUE | 3'b000 | 3'b010 | 3'b100 |
|---|---|---|---|
| 3'b000 | 3'b000 | 3'b000 | 3'b000 |
| 3'b010 | 3'b010 | 3'b010 | 3'b010 |
| 3'b100 | 3'b100 | 3'b100 | 3'b100 |

FIG. 31B

| LOWER 3 BITS OF PC RELATIVE VALUE \ LOWER 3 BITS OF ADDRESS VALUE | 3'b000 | 0b010 | 0b100 |
|---|---|---|---|
| 3'b000 | 3'b000 | 3'b000 | 3'b000 |
| 3'b010 | 3'b010 | 3'b010 | 3'b010 |
| 3'b100 | 3'b100 | 3'b100 | 3'b100 |

FIG. 32

| | | | | | | | |
|---|---|---|---|---|---|---|---|
| 29'h00000000 | 0;0; | f: | ret ...2601 | 0;0;nop ...2602 | 1;0; nop ...2603 | 0 ...2600 | |
| 29'h00000001 | 0;0; | L1: | mov r2, r1 ...2605 | 1;0;jsr 13'h1ff8 ...2606 | 0;0; add r0, r4 ...2607 | 0 ...2604 | |
| 29'h00000002 | 0;0; | | and r1, r3 ...2609 | 1;1;mov 32'h12345680, r2 | ...2610 | 0 ...2608 | |
| 29'h00000003 | 0;0; | | ld (r2), r0 ...2612 | 1;0;bra 13'h1ff0 ...2613 | 0;0; add r2, r3 ...2614 | 0 ...2611 | |
| ... | | | | | | | |
| 29'h02468ad0 | | L2: | | | | 0 ...2615 | |

FIG. 33

| | | | | ...2700 | ...2704 | ...2708 | ...2711 | ...2715 |
|---|---|---|---|---|---|---|---|---|
| 29'h00000000 | 0;0; | f: | ret ...2701 | 0;0;nop ...2702 | nop ...2703 | 0 | | |
| 29'h00000001 | 0;0; | L1: | mov r2, r1 ...2705 | 1;0;jsr 13'h1ff6 ...2706 | add r0, r4 ...2707 | 0 | | |
| 29'h00000002 | 0;0; | | and r1, r3 ...2709 | 1;1;mov 32'h12345680, r2 | ...2710 | 0 | | |
| 29'h00000003 | 0;0; | | ld (r2), r0 ...2712 | 1;0;bra 13'h1fee ...2713 | add r2, r3 ...2714 | 0 | | |
| ... | | | | | | | | |
| 29'h02468ad0 | L2: | | | ... | | | 0 | |

|  | MNEMONIC | OPERATION |
|---|---|---|
| FIG. 35A | addpc disp, Rn | Rn + disp −> Rn |
| FIG. 35B | subpc disp, Rn | Rn − disp −> Rn |

FIG. 38

```
extern int g1 ();
extern int g2 ();
extern int g3 ();
extern int g4 ();

f ( int i )
{
        int (*fp) ();

switch(i) {
            case 1 : fp = g1 ;
                    break ;
            case 2 : fp = g2 ;
                    break ;
            case 3 : fp = g3 ;
                    break ;
            default : fp = g4 ;
        }

```
f:        tmp = PC              3201
          i != 1                3202
          br L1                 3203
          fp = (g1 - f) + tmp   3204
          jmp L                 3205
L1:       i != 2                3206
          br L2                 3207
          fp = (g2 - f) + tmp   3208
          jmp L                 3209
L2:       i != 3                3210
          br L3                 3211
          fp = (g3 - f) + tmp   3212
          jmp L                 3213
L3:       fp = (g4 - f) + tmp   3214
L:        * (fp) (i)            3215
```

FIG. 40

| | | | |
|---|---|---|---|
| f : | mov | PC, r1 | 3201 |
| | compne | 1, r0 | 3202 |
| | br | L1 | 3203 |
| | addpc | g1−f, r1 | 3204 |
| | jmp | L | 3205 |
| L1 : | cmpne | 2, r0 | 3206 |
| | br | L2 | 3207 |
| | addpc | g2−f, r1 | 3208 |
| | jmp | L | 3209 |
| L2 : | cmpne | 3, r0 | 3210 |
| | br | L3 | 3211 |
| | addpc | g3−f, r1 | 3212 |
| | jmp | L | 3213 |
| L3 : | addpc | g4−f, r1 | 3214 |
| L : | jsr | (r1) | 3215 |
| | ret | | 3216 |

… # PROCESSOR FOR EXECUTING INSTRUCTIONS IN UNITS THAT ARE UNRELATED TO THE UNITS IN WHICH INSTRUCTIONS ARE READ, AND A COMPILER, AN OPTIMIZATION APPARATUS, AN ASSEMBLER, A LINKER, A DEBUGGER AND A DISASSEMBLER FOR SUCH PROCESSOR

This divisional application of U.S. Ser. No. 09/301,284, filed on Apr. 28, 1999, now U.S. Pat. No. 6,880,150.

This application is based on an application No. H10-118326 filed in Japan, the content of which is hereby incorporated by reference.

BACKGROUND OF THE INVENTION

1. Field of the Invention

The present invention relates to a processor for executing instructions in units that are unrelated to the units in which instructions are read, and a compiler, an optimization apparatus, an assembler, a linker, a debugger and a disassembler for such processor.

2. Description of the Prior Art

Processors conventionally read and execute instructions stored in memory according to a program counter. FIG. 1 is a block diagram showing the basic construction of an example processor.

The instruction memory 4301 stores four 8-bit instructions as one instruction packet.

The program counter 4300 indicates the address of an instruction packet in the instruction memory 4301.

The instruction reading unit 4302 reads the instruction packet indicated by the program counter 4300 from the instruction memory 4301.

The instruction executing unit 4303 executes all four instructions included in the read instruction packet in one cycle.

In this way, a conventional processor can read an instruction packet that is indicated by the program counter and can execute four instructions in the instruction packet.

The above processor has to execute all of the instructions in the read instruction packet in one cycle. Accordingly, when one or more instructions in an instruction packet cannot be executed due to problems with computer system resources such as memory or I/O, none of the instructions in the instruction packet can be executed until such problems are resolved. This slows program execution.

SUMMARY OF THE INVENTION

In view of the stated problems, it is a primary object of the present invention to provide a processor that executes instructions in units that are unrelated to the units in which instructions are read from a program and a program development environment for generating suitable programs.

This primary object is achieved by a processor for reading instructions from a memory according to a program counter, the memory storing instructions in one-byte units, and for executing the read instructions, the program counter including a first program counter and a second program counter, the first program counter indicating a storage position of a processing packet in the memory, the processing packet being composed of an integer number of the one-byte units, the second program counter indicating a position of processing target instruction in the processing packet, the processing target instruction being an operation to be executed by the processor.

With the stated construction, the first program counter indicates a storage position in the memory of a processing packet whose size is an integer number of bytes. Reads from the memory are performed based on this first program counter. The second program counter can indicate any position of a processing target instruction included in the processing packet read from the memory. As a result, the instruction(s) to be executed can be freely set regardless of the amount of data read in one read operation. This means that instructions whose word length is not an integer number of bytes can be executed even when read operations from the memory to the processor are performed in units of an integer number of bytes.

Here, the processor may include a first program counter updating unit and a second program counter updating unit, the second program counter updating unit incrementing a value of the second program counter in accordance with an amount of instructions that were executed in a preceding cycle and sending any carry generated in an incrementing to the first program counter updating unit, and the first program counter updating unit adding the carry received from the second program counter updating unit to the value of the first program counter.

With the stated construction, the value of the program counter is incremented by the amount of instructions that have just been executed, so that the program counter can be updated to indicate the first position of the instructions to be executed in the next cycle.

Here, the processor may further include: a program counter relative value extracting unit for extracting, when an instruction being executed includes a program counter relative value that is based on an address of a first instruction executed in a present cycle, the program counter relative value; and a calculating unit for adding the program counter relative value to the value of the first program counter and the value of the second program counter, and setting an addition result as the value of the first program counter and the value of the second program counter.

When the processor executes a branch instruction, the value of the program counter is added to a program counter relative value that is a difference in addresses between the present branch instruction and the branch destination instruction. The result of this addition is then set as the new value of the program counter to have the program counter indicate the branch destination instruction.

Here, the calculating unit may include a first calculating unit and a second calculating unit, the second calculating unit adding the value of the second program counter and lower bits of the program counter relative value, setting a result of an addition as the value of the second program counter, and sending any carry generated in the addition to the first calculating unit, and the first calculating unit adding the value of the first program counter, upper bits of the program counter relative value, and any carry received from the second calculating unit, and setting a result of an addition as the value of the first program counter.

When the processor executes a branch instruction and the program counter and a program counter relative value are added, a carry generated when calculating the lower bits is properly considered when calculating the upper bits. In this way, addresses can be calculated with proper continuity between the calculation of the lower bits and the calculation of the upper bits.

Here, the calculating unit may include a first calculating unit and a second calculating unit, the second calculating unit adding the value of the second program counter and lower bits of the program counter relative value without generating a carry, and setting a result of an addition as the value of the second program counter, the first calculating unit adding the value of the first program counter and upper bits of the program counter relative value, and setting a result of an addition as the value of the first program counter.

When the processor executes a branch instruction, calculation of the lower bits of the value of the program counter and the program counter relative value by the second calculating unit does not generate a carry to the calculation of the upper bits of the value of the program counter and the program counter relative value by the first calculating unit. As a result, the calculations of the first and second calculators can be performed independently of one another, so that a simplified hardware construction can be used.

Here, the calculating unit may add the value of the first program counter and upper bits of the program counter relative value, sets a result of an addition as the value of the first program counter, and sets lower bits of the program counter relative value as the value of the second program counter.

When the processor executes a branch instruction, no calculation using the value of the second program counter and the lower bits of the program counter relative value is required, so that the processor can execute branch instructions at a higher speed.

Here, the calculating unit may add the program counter relative value and a value whose upper bits are the value of the first program counter and lower bits are the value of the second program counter, and sets upper bits of a result of an addition as the value of the first program counter and lower bits of the result as the second program counter.

When the processor executes a branch instruction, the calculation using the value of the program counter and the program counter relative value can be performed by a standard calculator. This means the hardware construction of the processor can be simplified.

Here, the processor may further include: a program counter relative value extracting unit for extracting, when an executed instruction includes a program counter relative value that is based on an address of the executed instruction, the program counter relative value; a program counter amending unit for amending the value of the first program counter and the value of the second program counter to indicate an address of the executed instruction; and a calculating unit for adding the program counter relative value, the value of the first program counter, and the value of the second program counter, and setting a result of an addition as the value of the first program counter and the value of the second program counter.

The program counter relative value is the difference in addresses between a branch instruction and the branch destination instruction, so that it will not be necessary to change the program counter relative value even when there is a change in the boundaries marking which instructions in the program will be executed in parallel.

Here, the processor may further include: a program counter relative value calculating instruction decoding unit for decoding a program counter relative value calculating instruction that performs an addition using a program counter relative value and one of (a) a value of the program counter stored in a register, and (b) the value of the first program counter and the value of the second program counter; a calculating unit for performing the addition indicated by the program counter relative value calculating instruction to generate an addition result; and a program counter value updating unit for storing the addition result in one of (a) the register, and (b) the first program counter and the second program counter.

With the stated construction, it is possible to use an instruction that indicates a calculation using the value of the program counter and a program counter relative value in place of an instruction that stores the absolute address of a function into a register. A program counter relative value has a shorter bit width that the absolute address of an instruction, so that the overall code size can be reduced. When using PIC codes where the addresses of instructions in memory are only determined when the program is executed, absolute addresses cannot be used, so that calculation instructions that use the program counter and a program counter relative value are essential.

Here, the first program counter may indicate a memory address, the memory address being a storage position in the memory of a processing packet that is given by bit shifting the value in the first program counter by $\log_2 n$ bits in a leftward direction, n being a length of a processing packet in bytes.

With the stated construction, while separate addresses are assigned to each one-byte storage packet in the memory, the value of the first program counter corresponds with the address of a processing packet in the memory. As a result, the processor can easily specify a processing packet in the memory.

Here, the processor may further include: an instruction buffer for temporarily storing instructions; and an instruction reading unit for transferring instructions with a minimum transfer size of one one-byte unit from the memory to the instruction buffer, in accordance with available space in the instruction buffer but regardless of a size of a processing packet.

With the stated construction, the amount of data read by the processor from the memory in one read operation can be freely set, so that the construction in the processor for reading instructions can be made highly flexible.

The stated primary object can also be achieved by an instruction sequence optimizing apparatus, for generating optimized code from an instruction sequence, including: an address assigning unit for estimating a size of each instruction in the instruction sequence and assigning an address to each instruction, upper bits of each address indicating a memory address at which a processing packet is stored and lower bits of each address indicating a processing target instruction in the processing packet; a label detecting unit (1) for detecting a label, which should be resolved by an address of a specified instruction, from the instruction sequence, and obtaining the address of the specified instruction, and (2) for detecting a label, which should be resolved by a difference in addresses of two specified instructions, from the instruction sequence, and obtaining the addresses of the two specified instructions; a program counter relative value calculating unit for calculating, when a label which should be resolved by a difference in addresses of two specified instructions has been detected, a program counter relative value by subtracting an address of one of the two specified instructions from an address of another of the two specified instructions; a converting unit (1) for converting an instruction that has a label that should be resolved by an address of a specified instruction into an instruction with a size that is based on a size of the address of the specified instruction, (2) for converting an instruction that has a label that should be resolved by a difference in addresses of two specified instructions into an instruction with a size that is based on a size of the program counter relative value calculated from the addresses of the two specified instructions; and an optimized code generating unit for generating optimized code by converting addresses of instructions in accordance with the sizes of instructions after conversion by the converting unit.

The above construction achieves an optimization apparatus for generating programs for a processor that executes branch instructions.

Here, the program counter relative value calculating unit may include a lower bit subtracting unit and an upper bit subtracting unit, the lower bit subtracting unit subtracting lower bits of the address of the one of the two specified instructions from lower bits of the address of the other of the two specified instructions, for setting a result of a subtraction as lower bits of the program counter relative value, and sending any carry generated in the subtraction to the upper bit subtracting unit, and the upper bit subtracting unit subtracting upper bits of the address of one of the two specified instructions and any carry received from the lower bit subtracting unit from upper bits of the address of the other of the two specified instructions, and for setting a result of a subtraction as upper bits of the program counter relative value.

The above construction achieves an optimization apparatus for generating programs for a processor which, when executing a branch instruction, calculates the address of a branch destination instruction using a carry method.

Here, the program counter relative value calculating unit may include a lower bit subtracting unit and an upper bit subtracting unit, the lower bit subtracting unit subtracting lower bits of the address of one of the two specified instructions from lower bits of the address of the other of the two specified instructions without generating a carry and setting a result of a subtraction as lower bits of the program counter relative value, and the upper bit subtracting unit subtracting upper bits of the address of one of the two specified instructions from upper bits of the address of the other of the two specified instructions, and for setting a result of a subtraction as upper bits of the program counter relative value.

The above construction achieves an optimization apparatus for generating programs for a processor which, when executing a branch instruction, calculates the address of a branch destination instruction without using a carry.

Here, the program counter relative value calculating unit may subtract upper bits of an address of one of the two specified instructions from upper bits of an address of the other of the two specified instructions, set a result of a subtraction as upper bits of the program counter relative value, and set lower bits of the other of the two specified instructions as lower bits of the program counter relative value.

The above construction achieves an optimization apparatus for generating programs for a processor which, when executing a branch instruction, calculates the address of a branch destination instruction using an absolute value.

The stated primary object can also be achieved by an assembler that generates relocatable code from an instruction sequence, each address of an instruction in the instruction sequence having upper bits that indicate a memory address at which a processing packet is stored and lower bits that indicate a position of processing target instruction that is included in the processing packet, the assembler including: a label detecting unit for detecting a label in the instruction sequence that should be resolved by a difference in addresses between two specified instructions, and obtaining the addresses of the two specified instructions; a program counter relative value calculating unit for calculating a program counter relative value by subtracting an address of one of the two specified instructions from an address of another of the two specified instructions; and a replacing unit for replacing the label with the program counter relative value calculated by the program counter relative value calculating unit.

The above construction achieves an assembler for generating programs for a processor that executes branch instructions.

Here, the program counter relative value calculating unit may include a lower bit subtracting unit and an upper bit subtracting unit, the lower bit subtracting unit subtracting lower bits of the address of the one of the two specified instructions from lower bits of the address of the other of the two specified instructions, for setting a result of a subtraction as lower bits of the program counter relative value, and sending any carry generated in the subtraction to the upper bit subtracting unit, and the upper bit subtracting unit subtracting upper bits of the address of one of the two specified instructions and any carry received from the lower bit subtracting unit from upper bits of the address of the other of the two specified instructions, and for setting a result of a subtraction as upper bits of the program counter relative value.

The above construction achieves an assembler for generating programs for a processor which, when executing a branch instruction, calculates the address of a branch destination instruction using a carry method.

Here, the program counter relative value calculating unit may include a lower bit subtracting unit and an upper bit subtracting unit, the lower bit subtracting unit subtracting lower bits of the address of one of the two specified instructions from lower bits of the address of the other of the two specified instructions without generating a carry and setting a result of a subtraction as lower bits of the program counter relative value, and the upper bit subtracting unit subtracting upper bits of the address of one of the two specified instructions from upper bits of the address of the other of the two specified instructions, and for setting a result of a subtraction as upper bits of the program counter relative value.

The above construction achieves an assembler for generating programs for a processor which, when executing a branch instruction, calculates the address of a branch destination instruction without using a carry.

Here, the program counter relative value calculating unit may subtract upper bits of an address of one of the two specified instructions from upper bits of an address of the other of the two specified instructions, set a result of a subtraction as upper bits of the program counter relative value, and set lower bits of the other of the two specified instructions as lower bits of the program counter relative value.

The above construction achieves an optimization apparatus for generating programs for a processor which, when executing a branch instruction, calculates the address of a branch destination instruction using an absolute value.

The stated primary object can also be achieved by a linker that generates object code by combining relocatable code, each address of an instruction in the relocatable code having upper bits that indicate a memory address at which a processing packet is stored and lower bits that indicate a position of processing target instruction that is included in the processing packet, the linker including: a relocation information detecting unit for detecting a label in the relocatable code that should be resolved by a difference in addresses between two specified instructions, and obtaining the addresses of the two specified instructions; a program counter relative value calculating unit for calculating a program counter relative value by subtracting an address of one of the two specified instructions from an address of another of the two specified instructions; and a replacing unit for replacing the label with the program counter relative value calculated by the program counter relative value calculating unit.

The above construction achieves a linker for generating programs for a processor that executes branch instructions.

Here, the program counter relative value calculating unit may include a lower bit subtracting unit and an upper bit subtracting unit, the lower bit subtracting unit subtracting lower bits of the address of the one of the two specified instructions from lower bits of the address of the other of the two specified instructions, for setting a result of a subtraction as lower bits of the program counter relative value, and sending any carry generated in the subtraction to the upper bit subtracting unit, and the upper bit subtracting unit subtracting upper bits of the address of one of the two specified instructions and any carry received from the lower bit subtracting unit from upper bits of the address of the other of the two specified instructions, and for setting a result of a subtraction as upper bits of the program counter relative value.

The above construction achieves a linker for generating programs for a processor which, when executing a branch instruction, calculates the address of a branch destination instruction using a carry method.

Here, the program counter relative value calculating unit may include a lower bit subtracting unit and an upper bit subtracting unit, the lower bit subtracting unit subtracting lower bits of the address of one of the two specified instructions from lower bits of the address of the other of the two specified instructions without generating a carry and setting a result of a subtraction as lower bits of the program counter relative value, and the upper bit subtracting unit subtracting upper bits of the address of one of the two specified instructions from upper bits of the address of the other of the two specified instructions, and for setting a result of a subtraction as upper bits of the program counter relative value.

The above construction achieves a linker for generating programs for a processor which, when executing a branch instruction, calculates the address of a branch destination instruction without using a carry.

Here, the program counter relative value calculating unit may subtract upper bits of an address of one of the two specified instructions from upper bits of an address of the other of the two specified instructions, set a result of a subtraction as upper bits of the program counter relative value, and set lower bits of the other of the two specified instructions as lower bits of the program counter relative value.

The above construction achieves a linker for generating programs for a processor which, when executing a branch instruction, calculates the address of a branch destination instruction using an absolute value.

The stated primary object can also be achieved by a disassembler that receives an indication of an address of an instruction in object code and outputs an assembler name of the instruction at the indicated address, each address of an instruction in the object code having upper bits that indicate a memory address at which a processing packet is stored and lower bits that indicate a position of processing target instruction that is included in the processing packet, the disassembler including: a program counter relative value extracting unit for extracting, when the indicated instruction includes a program counter relative value, the program counter relative value from the indicated instruction; a label addressing calculating unit for adding an address of the indicated instruction to the extracted program counter relative value and setting an addition result as a label address; a storing unit for storing a label name corresponding to each label address; and a searching unit for searching the storing unit for a label name that corresponds to the calculated label address and outputting the corresponding label name.

The stated construction can disassemble a program that includes a branch instruction. When the disassembled instruction is a branch instruction, the address of the branch destination instruction can be calculated from the program counter relative value. This address is then used to search the label table and so obtain the label name. As a result, the branch destination can be displayed to the user in the readily understandable form of a label name, even when program counter relative values are used in branch instructions.

Here, the label address calculating unit may include a lower bit calculating unit and an upper bit calculating unit, the lower bit calculating unit for adding lower bits of the address of the indicated instruction and lower bits of the program counter relative value, setting a result of an addition as lower bits of a label address, and sending any carry generated by the addition to the upper bit calculating unit, and the upper bit calculating unit adding upper bits of the address of the indicated instruction, upper bits of the program counter relative value, and any carry received from the lower bit calculating unit, and setting a result of the an addition as upper bits of the label address.

The above construction achieves a disassembler that can disassemble programs for a processor which, when executing a branch instruction, calculates an address of a branch destination instruction using a carry.

Here, the label address calculating unit may include a lower bit calculating unit and an upper bit calculating unit, the lower bit calculating unit adding lower bits of the address of the indicated instruction and lower bits of the program counter relative value without generating a carry, and setting a result of an addition as lower bits of a label address, and the upper bit calculating unit adding upper bits of the address of the indicated instruction and upper bits of the program counter relative value, and setting a result of an addition as upper bits of the label address.

The above construction achieves a disassembler that can disassemble programs for a processor which, when executing a branch instruction, calculates an address of a branch destination instruction without using a carry.

Here, the label address calculating unit may add upper bits of the address of the indicated instruction and upper bits of the program counter relative value, set a result of an addition as upper bits of the label address, and set lower bits of the program counter relative value as lower bits of the label address.

The above construction achieves a disassembler that can disassemble programs for a processor which, when executing a branch instruction, calculates an address of a branch destination instruction using an absolute value.

The stated primary object can also be achieved by a debugger that receives an indication of an address of an instruction in object code and replaces the instruction at the indicated address with a replacement instruction, each address of an instruction in the object code having upper bits that indicate a memory address at which a processing packet is stored and lower bits that indicate a position of processing target instruction that is included in the processing packet, the debugger including: a processing packet reading unit for reading a processing packet that is indicated by upper bits of the indicated address from the memory and writing the processing packet into an instruction buffer; an instruction writing unit for writing the replacement instruction into the processing packet in the instruction buffer over an instruction that is indicated by the lower bits of the indicated address; and a processing packet writing unit for writing the processing packet in the instruction buffer back into the memory after the replacement instruction has been written.

The above construction reads instructions in units of processing packets from a memory that stores instructions in one-byte storage packets, rewrites instructions in an instruction buffer, and writes instructions back into the memory in units of processing packets. This achieves a debugger that can debug instructions whose length is not an integer number of bytes.

The stated primary object can also be achieved by a compiler that generates an instruction sequence from source code, the compiler generating a program counter relative value calculating instruction that is executed by a processor, the program counter relative value calculating instruction being an instruction that performs a calculation using a first value and a program counter relative value and uses a result of the calculation to update the first value, the first value being one of (a) a value of a program counter stored in a register, and (b) the value stored in a program counter of the processor, wherein upper bits of the first value indicate a memory address at which a processing packet is stored, and lower bits of the first value of the program counter indicate a processing target instruction that is included in the processing packet.

The above construction achieves a compiler that generates programs for a processor that executes program counter relative value calculating instructions.

Here, the processor may include a lower bit calculating unit and an upper bit calculating unit, the program counter relative value calculating instruction having the lower bit calculating unit perform a lower bit calculation and the upper bit calculating unit perform an upper bit calculation, the lower bit calculation being an addition using lower bits of the first value and lower bits of the value of the program counter relative value, where a result of the lower bit calculation is set as the lower bits of the first value and any generated carry is sent to the upper bit calculating unit, and the upper bit calculation being an addition using upper bits of the first value, upper bits of the value of the program counter relative value and any carry received from the lower bit calculating unit, where a result of the upper bit calculation is set as the upper bits of the first value.

The above construction achieves a compiler that generates a program for a processor which, when executing a program counter relative value calculating instruction, performs a calculation using a value of the program counter and the program counter relative value according to a carry method.

Here, the processor may include a lower bit calculating unit and an upper bit calculating unit, the program counter relative value calculating instruction having the lower bit calculating unit perform a lower bit calculation and the upper bit calculating unit perform an upper bit calculation, the lower bit calculation being an addition using lower bits of the first value and lower bits of the value of the program counter relative value that does not generate a carry, where a result of the lower bit calculation is set as the lower bits of the first value, and the upper bit calculation being a calculation using upper bits of the first value and upper bits of the value of the program counter relative value, where a result of the upper bit calculation is set as the upper bits of the first value.

The above construction achieves a compiler that generates a program for a processor which, when executing a program counter relative value calculating instruction, performs a calculation using a value of the program counter and the program counter relative value without generating a carry.

Here, the processor may includes an upper bit calculating unit, the program counter relative value calculating instruction having the upper bit calculating unit perform an upper bit calculation and setting lower bits of the program counter relative value as lower bits of the first value, and the upper bit calculation being an addition using upper bits of the first value and upper bits of the value of the program counter relative value, where a result of the upper bit calculation is set as the upper bits of the first value.

The above construction achieves a compiler that generates a program for a processor which, when executing a program counter relative value calculating instruction, performs a calculation using a value of the program counter and the program counter relative value according to an absolute value calculating method.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2A shows the format of one instruction executed by the processor of the first embodiment of the present invention;

FIG. 2B shows the format of another instruction executed by the processor of the first embodiment of the present invention;

FIG. 2C shows the format of another instruction executed by the processor of the first embodiment of the present invention;

FIG. 2D shows the format of another instruction executed by the processor of the first embodiment of the present invention;

FIG. 2E shows the format of another instruction executed by the processor of the first embodiment of the present invention;

FIG. 7 is an increment table showing the rules used to increment the in-packet address;

FIG. 8A is an addition table showing the addition rules used when adding the lower 3 bits of the address of a branch instruction to lower 3 bits of the PC relative value;

FIG. 8B is a subtraction table showing the subtraction rules used when subtracting the lower 3 bits of the PC relative value from the lower 3 bits of a branch destination address;

FIG. 11 shows part of the optimization processing code 903 generated by the code optimization apparatus 902;

FIG. 12 shows the address assigned codes 916 generated from the optimization processing code 903 shown in FIG. 11;

FIG. 13 shows the label information 906 generated from the address assigned codes 916 shown in FIG. 12;

FIG. 14 shows the optimized code 304 generated from the address assigned codes 916 shown in FIG. 12;

FIG. 17 shows the machine language codes 803 that are generated from the optimized code 304 shown in FIG. 14;

FIG. 18 shows the label information that is generated from the machine language codes shown in FIG. 17;

FIG. 19 shows the relocatable codes that are generated from the machine language codes 803 shown in FIG. 17;

FIG. 22 shows the relocatable codes;

FIG. 23 shows the state when the relocatable codes 814 shown in FIG. 19 have been combined with the relocatable code shown in FIG. 22;

FIG. 24 shows the resulting combined codes 703;

FIG. 25 shows the label information that is generated from the combined codes 703 shown in FIG. 24;

FIG. 26 shows the object codes generated from the combined codes 703 shown in FIG. 24;

FIG. 27 shows the object code generated by the second embodiment of the present invention;

FIG. 28A shows the construction of an instruction packet in the third embodiment;

FIG. 28B shows the types of instructions used in the third embodiment;

FIG. 28C shows the relation between in-packet addresses and the instruction units in a packet;

FIG. 29A is an addition table showing the addition rules for adding the lower 3 bits of the address of the branch instruction and the lower 3 bits of the PC relative value in the calculation method of the fourth embodiment that does not use a carry;

FIG. 29B is a subtraction table showing the subtraction rules for subtracting the lower 3 bits of the address of the branch instruction from the lower 3 bits of the address of the branch destination instruction in the calculation method of the fourth embodiment that does not use a carry;

FIG. 30 shows the object code that is generated by the address calculation method of the fourth embodiment that does not use a carry;

FIG. 31A is an addition table showing the addition rules for adding the lower 3 bits of the address of the branch instruction and the lower 3 bits of the PC relative value in the calculation method of the fifth embodiment that uses absolute values;

FIG. 31B is a subtraction table showing the subtraction rules for subtracting the lower 3 bits of the address of the branch instruction from the lower 3 bits of the address of the branch destination instruction in the calculation method of the fifth embodiment that uses absolute values;

FIG. 32 shows the object code that is generated by the above address calculation method of the fifth embodiment that uses absolute values;

FIG. 33 shows the object code that has been generated using the linear calculation method of the sixth embodiment;

FIG. 35A shows the operation that corresponds to a PC adding instruction which is shown in mnemonic form;

FIG. 35B shows the operation that corresponds to a PC subtracting instruction which is shown in mnemonic form;

FIG. 38 shows source code which is written in C language;

FIG. 39 shows the intermediate codes that have been generated from the source program shown in FIG. 38;

FIG. 40 shows the assembler code that has been produced by converting the intermediate codes shown in FIG. 39;

DESCRIPTION OF THE PREFERRED EMBODIMENTS

Figure 1:
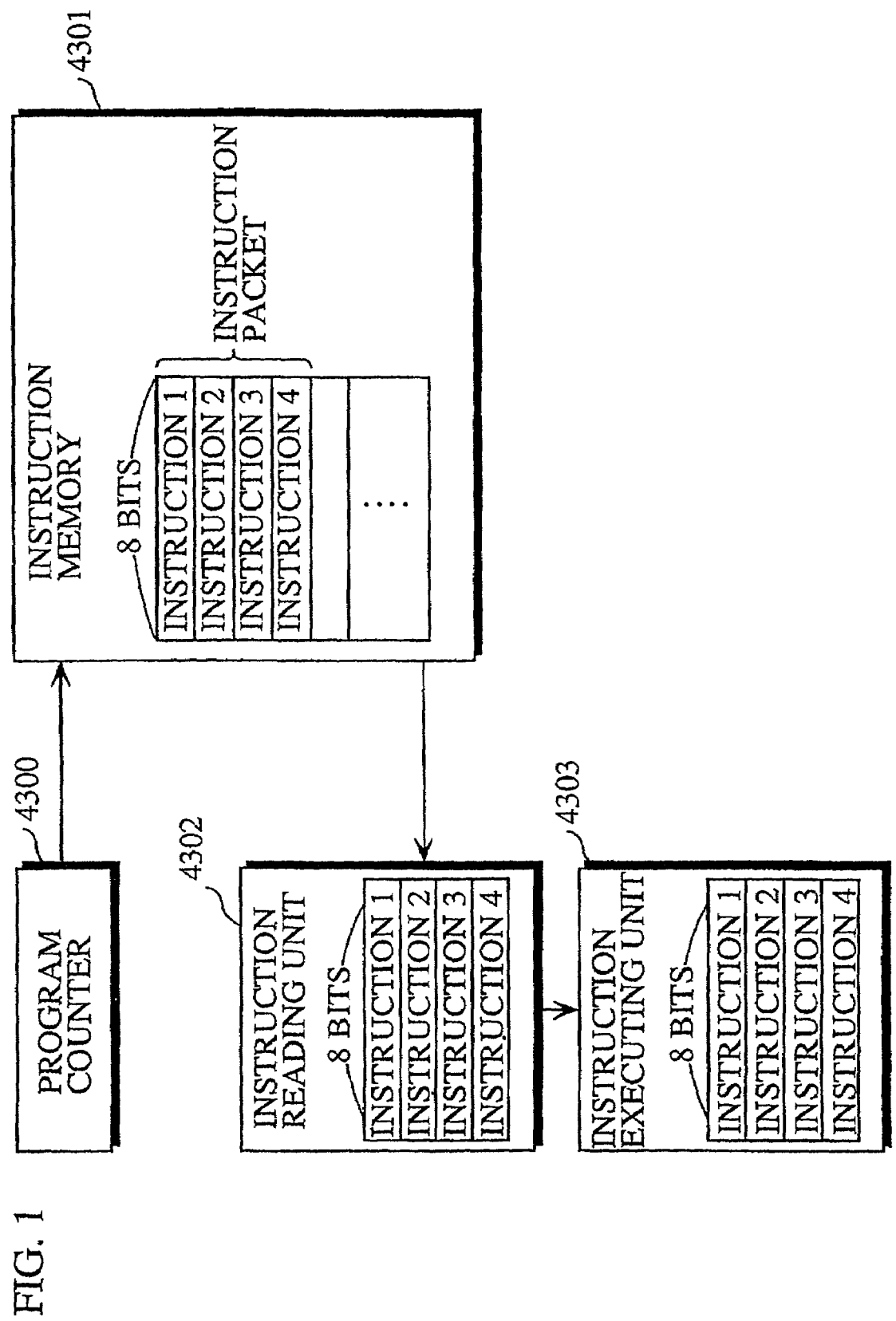
FIG. 1 is a block diagram showing the construction of a conventional processor.

The following is a detailed description of several embodiments of the present invention, with reference to the accompanying drawings.

First Embodiment

This first embodiment relates to an optimization apparatus, an assembler, and a linker that generate programs where read operations and execute operations have different units, and to a processor for executing such programs.

Formats of the Instructions Executed by the Processor

The following explains the formats of the instructions executed by the processor of this first embodiment. These formats are shown in FIGS. 2A~2E. The instructions executed by the present processor are constructed so that 21 bits is set as one instruction unit. For the present processor, there are both one-unit (i.e., 21-bit) and two-unit (i.e., 42-bit) instructions.

The format information 101 is written as one bit and shows the length of each instruction. When the format information 101 is "0", this shows that the unit including this format information 101 forms one complete instruction, which is to say, a 21-bit instruction. When the format information 101 is "1", this shows that the unit including this format information 101 and the following unit together form one two-unit instruction, which is to say, a 42-bit instruction.

The parallel execution boundary information 100 is also written as one bit and shows whether a parallel execution boundary exists between the instruction formed by the present unit and the following instruction. When the parallel execution boundary information 100 is "1", this shows that a parallel execution boundary exists between the instruction including this parallel execution boundary information 100 and the following instruction, so that these instructions will be executed in different cycles. When the parallel execution boundary information 100 is "0", this shows that no parallel execution boundary exists between the instruction including this parallel execution boundary information 100 and the following instruction, so that these instructions will be executed the same cycle.

The remaining bits in each instruction are used to show an operation. This means that 19 bits can be used to indicate the operation in a 21-bit instruction and that 40 bits can be used to indicate the operation in a 42-bit instruction. The fields marked "Op1", "Op2", "Op3", and "Op4" are used to store opcodes that indicate the type of operation to be performed. The field marked "Rs" is used to store the register number of a register used as the source operand and the field marked "Rd" is used to store the register number of a register used as the destination operand. The fields marked "imm5" and "imm" are respectively used to store 5-bit and 32-bit immediates that are used in calculations. Finally, the fields marked "disp13" and "disp32" are respectively used to store 13-bit and 32-bit displacements.

Transfer instructions and arithmetic instructions that handle long (such as 32-bit) constants and branch instructions that use large displacements are defined as 42-bit instructions. Most other instructions are defined as 21-bit instructions. Of the two units used to compose a 42-bit instruction, the latter unit is only used to store part of the long constant or displacement, and so does not store the opcode of the instruction.

Reading and Execution of Instructions by the Processor

Figure 3A:
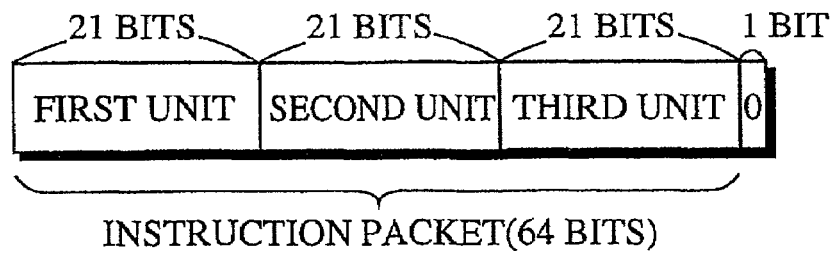
FIG. 3A shows an instruction packet that is the unit used for storing and reading instructions in this first embodiment.

The following explains the operation of the present processor when reading and executing instructions. Note that the processor of the present embodiment has a premise that static parallel scheduling is used. FIG. 3A shows an instruction packet that is the unit used for storing and reading instructions. Each instruction packet is composed of three instruction units (63 bits) and dummy data (1 bit). In each cycle, the processor reads instructions using this fixed 64-bit packet length. Packets of this size are used because the 21-bit unit size of instruction is not suited to reading from memory. Accordingly, a number of such instructions are read together with dummy data to make the total packet size equal to an integer number of bytes. In this example, since the number of instruction units in each instruction packet is not a power of two, there is the following special effect. This effect overcomes the problems that occur when positions of the units inside instruction packets are expressed using binary. In the following explanation, the three units in an instruction packet are called the first, second and third units in order starting from the unit with the lowest address value.

Figure 3B:
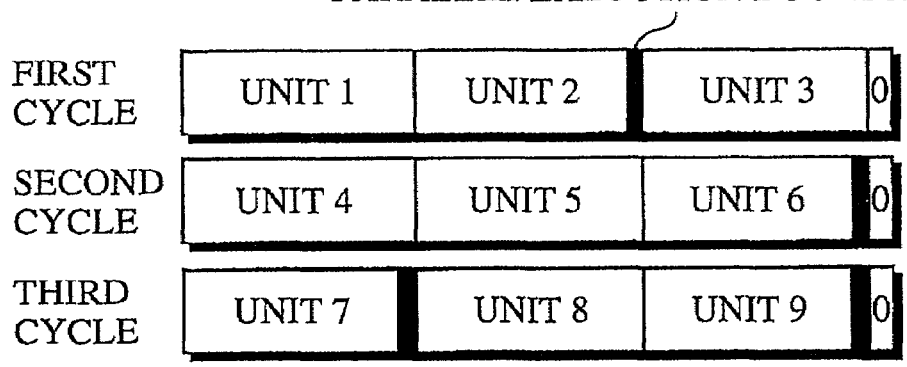
FIG. 3B shows the read order of instructions.

FIG. 3B shows the read order of instructions. As shown in the figure, one instruction packet is read in each cycle.

Figure 3C:
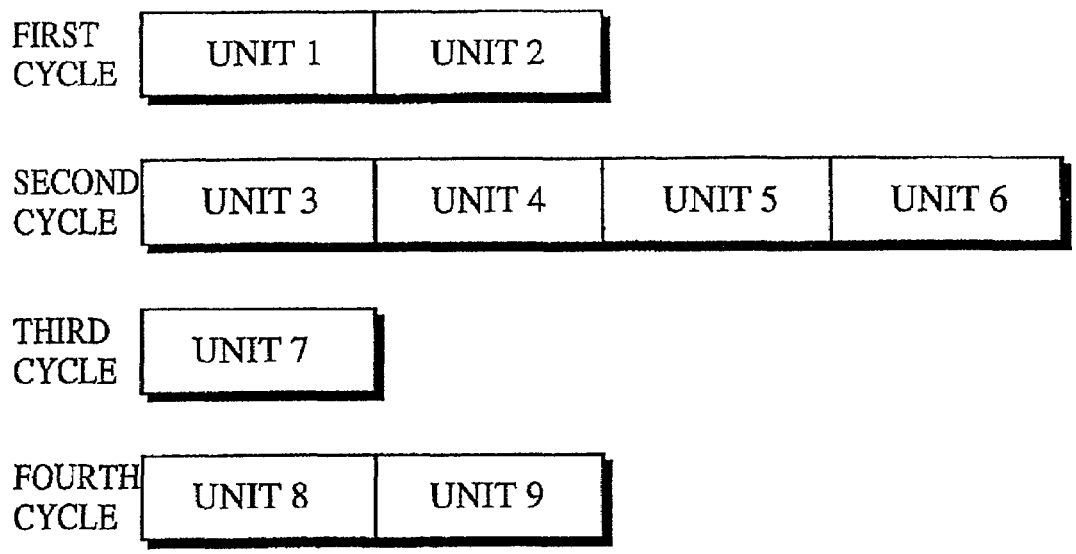
FIG. 3C shows the execution order of instructions.

FIG. 3C shows the execution order of instructions. In each cycle, instructions are executed as far as the next parallel execution boundary. This means that the instructions are executed up to and including an instruction whose parallel execution boundary information 100 is "1". Instruction units that are read but not executed are accumulated in the instruction buffer, and are executed in a later cycle.

As described above, the processor of the present embodiments reads instructions using packets of a fixed length, but only executes a suitable number of units in each cycle depending on parallelism of the instructions. The reason that the present processor can start the execution of instructions in one cycle at any of the instruction units in an instruction packet is that an in-packet address specifies an instruction unit in an instruction packet. This is described in more detail later.

Figure 4:
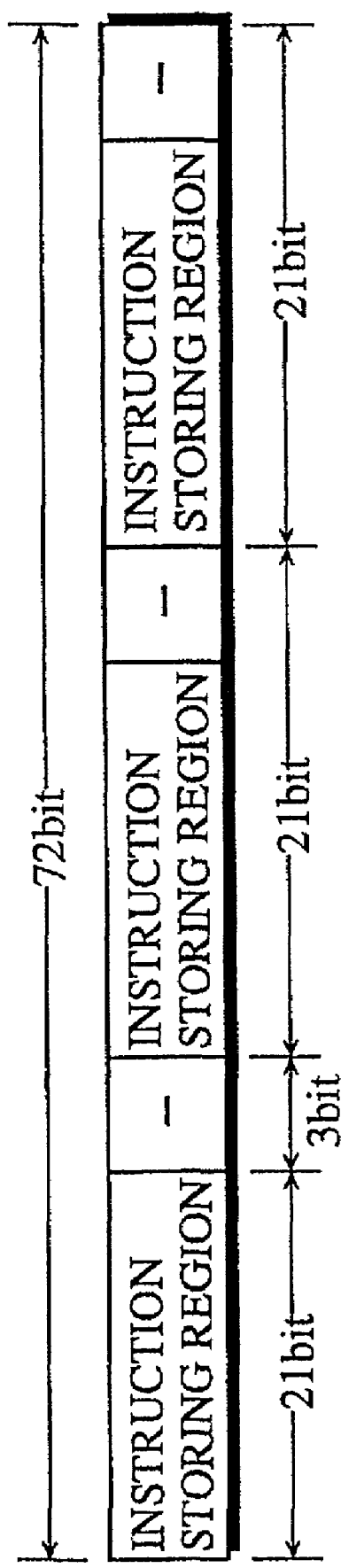
FIG. 4 shows an example of the methods used by a conventional processor to store and read instructions that are not byte-aligned.

FIG. 4 shows an example of the methods used by a conventional processor to store and read instructions that are not byte-aligned. When 21-bit instructions that are not byte-aligned are to be read in byte-units, three unused bits have to be added to the end of each instruction to make the instruction length 24-bits. This means that what are essentially 21-bit instructions are stored into and read from memory in 24-bit units. The length of three of such instructions is 72 bits, so that the storage of three instructions in a 64-bit packet in the present embodiment reduces overall program size.

Note that while the present embodiment describes the packet construction when 21-bit instructions are used, the invention is not limited to this instruction length. It is equally possible to construct instruction packets of instructions of a different length and to read the instructions using such instruction packets. As one example, when instructions are n-bits long, values of m and r may be selected so as to give a maximum value of $n*m \div (n*m+r)$ subject to $(n*m+r) \bmod 8 = 0$. One packet is then composed of m instruction units (each being n bits long) and r-bit dummy data. By doing so, instruction packets can be composed of multiple-byte size using relatively little dummy data.

Method for Expressing Instruction Addresses

The following explains the method used to express instruction addresses in the present embodiment. Here, an instruction address refers to the address used to specify the position of a unit and is expressed as 32 bits.

The upper 29-bits of a 32-bit address are used to specify an instruction packet and so are called the "packet address". This packet address is expressed as a 29-bit hexadecimal figure in a format such as "29'h01234567". A value produced by shifting the value of this packet address by 3-bits to the left is the memory address at which the instruction packet is stored.

The lower 3-bits in a 32-bit address are used to specify an instruction unit included in the instruction packet and so are called the "in-packet address". This in-packet address is expressed as a 3-bit binary value in a format such as "3'b001". As examples, the in-packet address "3'b001" specifies the first unit in an instruction packet, the in-packet address "3'b010" specifies the second unit, and the in-packet address "3'b100" specifies the third unit. However, the in-packet addresses are not limited to these specific values. Other values may be used provided that the instruction units in an instruction packet are each specified using their own value.

The indicating of addresses in this embodiment is such that only 3 bits are assigned for eight-bytes of instructions. This gives the same results as when a conventional processor assigns a separate address to each byte, since the upper 29-bits of addresses assigned to eight-bytes of instructions will be the same.

Method for Generating the Object Code Executed by the Processor

The following explains the method for generating the object code that is executed by the processor of the present embodiment.

First, the terminology to be used in this explanation is defined.

A "PC relative value" is the difference between the addresses of two instructions.

A "label" is either an "instruction address-resolved label" or a "PC relative value-resolved label". Absolute address-resolved labels are replaced with absolute addresses of instructions during the processing that converts a program into object code. An example of such a label is the label "L2" in the transfer instruction "mov L2, r1" that transfers an instruction stored in memory to the register r1. PC relative value-resolved labels are replaced with PC relative values during the processing that converts a program into object code. An example of such a label is the label "L1" in the unconditional branch instruction "bra L1" that performs an unconditional branch using the PC relative value. "Local labels" and "external labels" also exist as other types of label. When a label and the instruction including the label are included in the same module (a module being a subprogram composed of an instruction sequence achieving one processing function), such label is called a local label, while when the label and instruction including the label are included in different modules, such label is called an external label.

Figure 5:
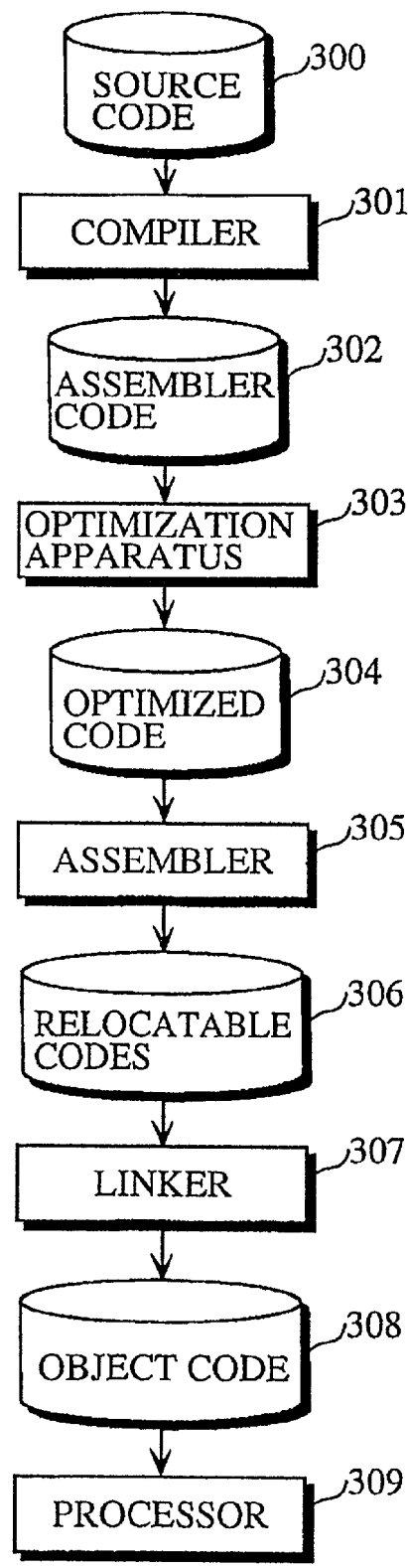
FIG. 5 shows the procedure by which the object code to be executed by the processor is generated by a compiler, optimization apparatus, assembler, and linker.

FIG. 5 shows the procedure by which the object code to be executed by the processor is generated by a compiler, optimization apparatus, assembler, and linker. An overview of the functions of these components is given below.

The compiler 301 analyzes the content of the source code 300 that is written in a high-level language like C and outputs assembler code 302.

The optimization apparatus 303 assigns temporary addresses to the assembler code 302, links the instruction sequences in groups of three instruction units, and outputs optimized code 304 as the linked results. In this process, local labels are calculated as PC relative values or instruction addresses. The instruction size, which is to say, whether an instruction should be expressed as a one-unit instruction or as a two-unit instruction, is then determined based on the value of the PC relative value or the instruction address.

The assembler 305 outputs relocatable codes 306 which it generates from the optimized code 304. This processing converts local labels that should be resolved with PC relative values into PC relative values.

The linker 307 combines a plurality of modules. That is, the linker 307 combines a plurality of relocatable codes 306 and outputs the resulting object code 308. In this processing, unresolved labels are converted into PC relative values or instruction addresses.

The processor 309 executes the object code 308.

As described above, a program written in a high-level language is converted by the compiler 301, the optimization apparatus 303, the assembler 305, and the linker 307 into object code that is in a format executable by the processor. Each label in the program is converted into a PC relative value or an instruction address by one of the steps in the above procedure. Address resolution for local labels that should be resolved by a PC relative value is performed by the assembler 305. Address resolution for local labels that should be resolved by an instruction address and address resolution for external labels are performed by the linker 307.

The following describes the construction and operation of the processor 309, the linker 307, the assembler 305, and the optimization apparatus 303 shown in FIG. 4.

Processor

Figure 6:
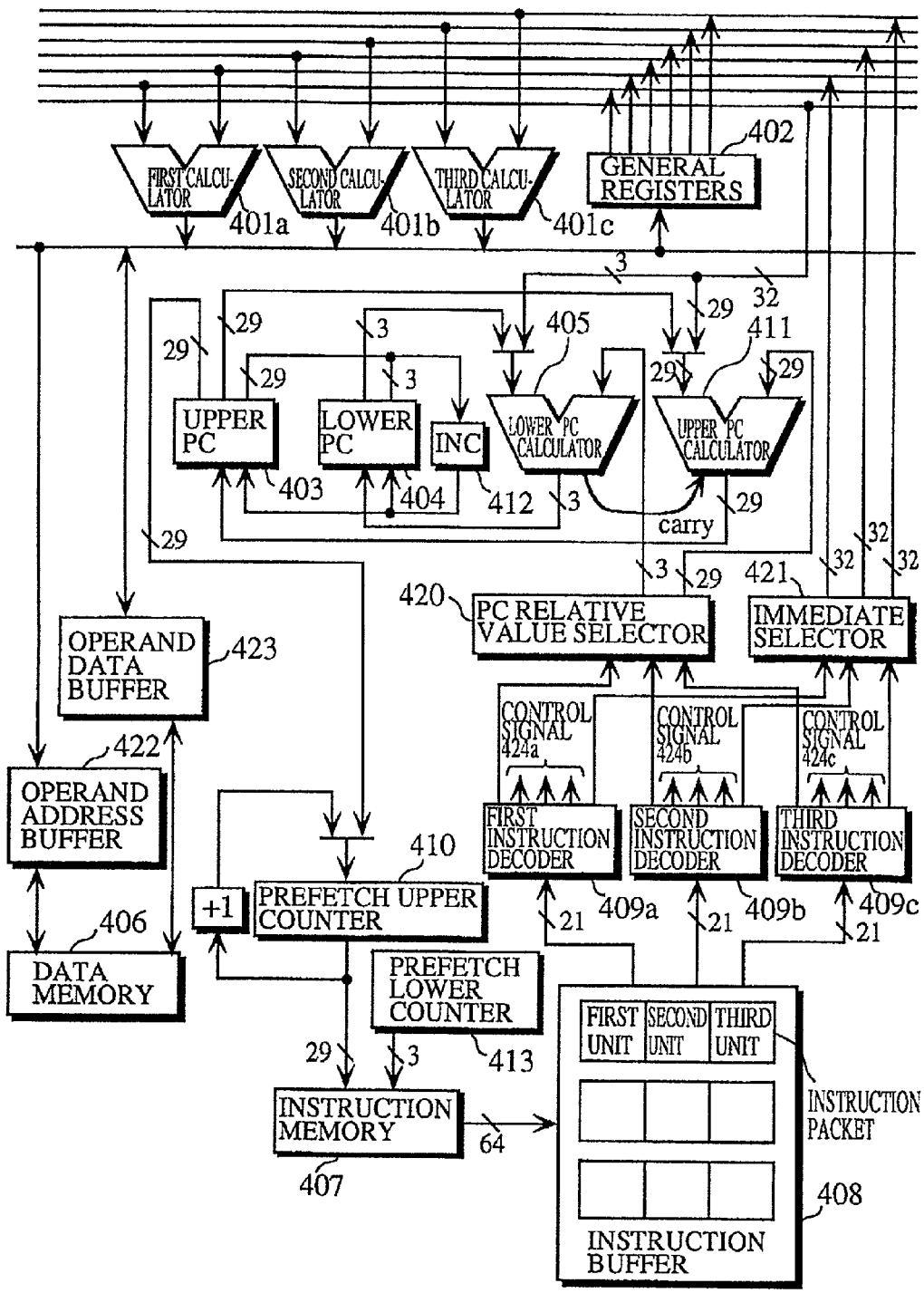
FIG. 6 is a block diagram showing the details of the processor 309 and the external memory.

FIG. 6 is a block diagram showing the details of the processor 309 and the external memory.

The processor 309 is capable of executing a maximum of three instructions in parallel. This processor 309 includes calculators 401a~401c, general registers 402, an upper PC 403, a lower PC 404, an upper PC calculator 411, a lower PC calculator 405, an INC 412, an instruction buffer 408, an prefetch upper counter 410, a prefetch lower counter 413, instruction decoder 409a~409c, a PC relative value selector 420, an immediate selector 421, an operand data buffer 423, and an operand address buffer 422. The external memory includes the data memory 406 and the instruction memory 407.

In the following explanation, the upper PC 403 and the lower PC 404 will be collectively referred to as the "PC", and the upper PC calculator 411 and the lower PC calculator 405 will be collectively referred to as the "PC calculator".

The first calculator 401a, the second calculator 401b, and the third calculator 401c each perform one calculation. These calculators are capable of calculating at the same time.

The general registers 402 store data, addresses and other data.

The upper PC 403 stores the upper 29 bits of the address of the first instruction in a set of instructions to be executed in the next cycle, which is to say, a packet address.

The lower PC 404 stores the lower 3 bits of the address of the first instruction in a set of instructions to be executed in the next cycle, which is to say, an in-packet address.

The instruction memory 407 stores instructions that are expressed by the object code 308.

The instruction buffer 408 stores instructions that have been read from the instruction memory 407.

The first instruction decoder 409a, the second instruction decoder 409b, and third instruction decoder 409c decode instructions and, if the respective instructions are executable, give indications to other components in the processor to have the instructions executed. The first instruction decoder 409a receives an input of the first instruction stored in the instruction buffer 408, the second instruction decoder 409b an input of the next instruction, and the third instruction decoder 409c an input of a next instruction. These instruction decoders 409a~409c investigate whether there is a parallel execution boundary between the instruction units and only have the instructions that should be executed in the present cycle executed. As one example, when an instruction performs a calculation using a constant, the constant is sent to the first calculator 401a via the immediate selector 421 and the first calculator 401a is instructed to perform the calculation. For a branch instruction, a PC relative value is sent via the PC relative value selector 420 to the lower PC calculator 405 and upper PC calculator 411 that are then instructed to update the PC. The instruction decoders 409a~409c send control signals showing the number of executed instruction units to have the INC 412 update the PC increment, and send control signals showing the number of executed instruction units to the instruction buffer 408 to have the executed instruction units deleted from the instruction buffer 408.

The PC relative value selector 420 outputs the PC relative value outputted by the instruction decoders 409a~409c to the lower PC calculator 405 and the upper PC calculator 411.

The immediate selector 421 outputs an immediate outputted by the instruction decoders 409a~409c to the general registers 402 and the calculators 401a~401c.

The INC 412 receives information regarding the number of executed instruction units via control signals sent by the instruction decoders 409a~409c, and increments the value of the upper PC 403 and the lower PC 404 in accordance with this number. By doing so, the INC 412 sets the packet address of the first instruction in the set of instructions to be executed in the next cycle in the upper PC 403 and the in-packet address of the first instruction in the set of instructions to be executed in the next cycle in the lower PC 404.

The upper PC calculator 411 and lower PC calculator 405 respectively update the upper PC 403 and the lower PC 404. When a branch instruction is decoded by the instruction decoders 409a~409c, the upper PC calculator 411 and lower PC calculator 405 respectively receive the upper 29 bits and the lower 3 bits of the PC relative value included in the branch instruction of the PC relative value. The lower PC calculator 405 increases or decreases the present value of the lower PC 404 by the lower 3 bits in the PC relative value and sends the calculation result to the lower PC 404 as the new lower PC. The upper PC calculator 411 increases or decreases the present value of the upper PC 403 by the upper 29 bits in the PC relative value and sends the calculation result to the upper PC 403 as the new upper PC. This operation of the PC calculators is described later in this specification. As described above, when a branch instruction is executed, the packet address of the branch destination instruction that is to be executed next is set in the upper PC 403 and the in-packet address is set in the lower PC 404. There are also cases where the upper PC calculator 411 and lower PC calculator 405 update the PC by calculating an address using a PC relative value and an address stored in the general registers 402.

The prefetch upper counter 410 shows the upper 29 bits of the address of the first instruction in the set of instructions to be read from the instruction memory 407, which is to say, the packet address. The prefetch upper counter 410 normally increments this value by one in each cycle. When a branch instruction was executed in the previous cycle, the packet address of the branch destination instruction set in the upper PC 403 is sent to the prefetch upper counter 410 where it is set in place of the present value in the prefetch upper counter 410.

The prefetch lower counter 413 shows the lower 3 bits of the address of the first instruction in the set of instructions read from the instruction memory 407, which is to say, the in-packet address. In this embodiment, the value "3'b000" is set in the prefetch lower counter 413. As a result, the instructions to be read are indicated in packet units, so that one packet is sent from the instruction memory 407 to the instruction buffer 408 in each cycle.

The data memory 406 stores operand data.

The operand data buffer 423 and operand address buffer 422 are buffers that are located between the data memory 406 and the processor.

The following explains the incrementing method and calculating method for instruction addresses. This is the most characteristic feature of the present embodiment.

Incrementing Method for Instruction Addresses

The incrementing of addresses is performed by adding an increment value to the in-packet address of an instruction, and adding any carry produced by the addition to the packet address.

FIG. 7 is an increment table showing the rules used to increment the in-packet address. As shown in the figure, when the in-packet address is "3'b000" or "3'b010", the incrementing of the instruction address is performed by adding 2 to the in-packet address. When the in-packet address is "3'b100", a carry to the packet address is produced (which is to say, 1 is to be added to the upper 29 bits of the instruction address) and the in-packet address is updated to "3'b000". This means that the incrementing of the in-packet address is a calculation that cycles through the three values "3'b000", "3'b010", and "3'b100". As one example, when the increment value is "2" and the value of the in-packet address before incrementing is "3'b100", the packet address after incrementing is "3'b010" and a carry of "1" to the packet address is generated.

Note that in the present embodiment, the in-packet address does not need to be expressed in binary. This is especially effective when the number of instruction units in an instruction packet is not a power of 2. When this is the case, it is not possible to express the position of an instruction unit in an instruction packet in binary and use a binary calculation to shift the position of an instruction unit. However, in the present embodiment, the position of an instruction unit in an instruction packet is expressed using m different values. By using a calculation that cycles through these m values, the specifying of instruction units and the calculations for shifting the instruction position can be achieved even if the number of instruction units in an instruction packet is not a power of 2.

Method for Calculating the Instruction Address

The following explains the carry method which is one of the methods used for calculating the instruction addresses in the present invention. Other methods used to calculate addresses are a separation method, an absolute position indicating method, and a linear addressing method, though these will be described later in this specification. In the carry method, the upper 29 bits and lower 3 bits of an instruction address are calculated separately. However, when calculating the upper bits, any carry to or from the upper 29 bits that occurred when calculating the lower 3 bits is taken into account.

The following explains the method by which the present processor adds the address of a branch instruction and a PC relative value to find a branch destination address. The lower PC calculator 405 shown in FIG. 6 adds the lower 3 bits of the address of a branch instruction to the lower 3 bits of the PC relative value. FIG. 8A is an addition table showing the addition rules used when adding the lower 3 bits of the address of a branch instruction to lower 3 bits of the PC relative value. As shown in FIG. 8A, this addition of the lower 3-bit values differs from a binary calculation in being a calculation that cycles through the three values "3'b000", "3'b010", and "3'b100". When a carry occurs as shown in FIG. 8A, the lower PC calculator 405 sends the carry to the upper PC value to the upper PC calculator 411.

The upper PC calculator 411 shown in FIG. 6 adds the upper 29 bits of the address of a branch instruction to the upper 29 bits of the PC relative value. When doing so, if the calculation of the lower PC calculator 405 has resulted in a carry to the upper PC, the upper PC calculator 411 also adds this carry. This addition is a normal addition of binary values.

The addition results of the lower PC calculator 405 and upper PC calculator 411 form the address of the branch destination instruction. The addition result for the lower 3 bits is set in the lower PC 404 and the addition result for the upper 29 bits is set in the upper PC 403.

The following explains the calculations of the optimization apparatus 303, assembler 305, and linker 307 for finding the PC relative value, which is to say the subtraction of the branch instruction address from the branch destination address. Like the addition described above, this subtraction is performed separately for the upper 29 bits and lower 3 bits. The lower address subtraction means 907 of the optimization apparatus 303, the lower address subtraction means 806 of the assembler 305, and the lower address subtraction means 706 of the linker 307 subtract the lower 3 bits of the branch instruction address from the lower 3 bits of the branch destination address. FIG. 8B is a subtraction table showing the subtraction rules used when subtracting the lower 3 bits of the PC relative value from the lower 3 bits of a branch destination address. As shown in FIG. 8B, this subtraction of the lower 3-bit values differs from a binary calculation in being a calculation that cycles through the three values "3'b000", "3'b010", and "3'b100". When a carry occurs as shown in FIG. 8B, the lower address subtraction means that performs the calculation (such as lower address subtraction means 907) sends the carry from the upper PC value to the corresponding upper address subtraction means (such as upper address subtraction means 910). The various upper address subtraction means are described in more detail later.

The upper address subtraction means 910 in the optimization apparatus 303, the upper address subtraction means 809 in the assembler 305, and upper address subtraction means 709 in the linker 307 subtract the upper 29 bits of the address of a branch instruction from the upper 29 bits of the address of the branch destination instruction. When doing so, if the calculation of the lower address subtraction means 907 (or similar) has resulted in a carry from the upper PC, the upper address subtraction means 910 (or similar) also subtracts this carry. This subtraction is a normal subtraction of binary values.

These subtraction results respectively form the lower 3 bits and the higher 29 bits of the PC relative value. This method is also used when the processor finds the address of a branch destination instruction by executing a subtraction on the address of a branch instruction and a PC relative value.

The optimization apparatus 303, assembler 305, and linker 307, which calculate a PC relative value from the difference between the address of a branch destination instruction and the address of a branch instruction, and the processor 309, which calculates the address of a branch destination instruction using this PC relative value, calculate addresses using the same carry method. As a result, when executing a branch instruction, the processor can correctly calculate the address of a branch destination instruction from the PC relative value. This address calculation method that uses a carry has a feature in that it can calculate addresses perform separate calculations for upper bits and lower bits while maintaining the continuity between the two.

Optimization Apparatus

Figure 9:
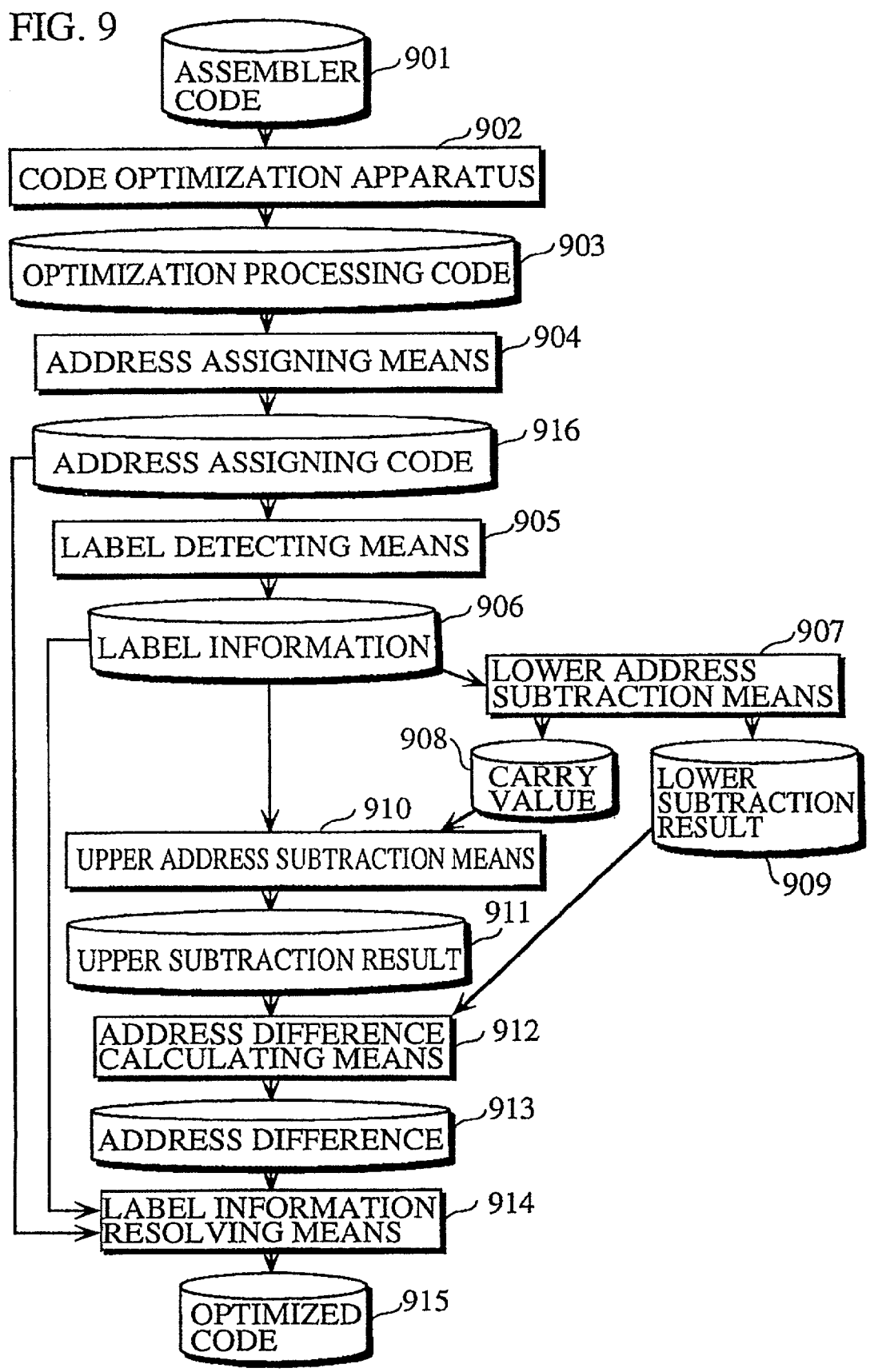
FIG. 9 is a block diagram showing the components and input/output data of the optimization apparatus 303.

FIG. 9 is a block diagram showing the components and input/output data of the optimization apparatus 303 shown in FIG. 5. This optimization apparatus 303 optimizes the assembler code 302 generated by the compiler 301, links the instruction sequences together in packets of three instruction units, and outputs the resulting optimized code 304. The optimization apparatus 303 includes a code optimization apparatus 902, an address assigning means 904, a label detecting means 905, a lower address subtraction means 907, an upper address subtraction means 910, an address difference calculating means 912, and a label information resolving means 914.

The code optimization apparatus 902 optimizes the assembler code 302 and so generates the optimization processing code 903. This processing of the code optimization apparatus 902 is the same as any well-known optimization apparatus, and so will not be described.

The address assigning means 904 estimates an address for each instruction in the optimization processing code 903 produced by the code optimization apparatus 902 and assigned an estimated address to each instruction. These addresses are called provisional addresses in this specification. As a result, the address assigning means 904 outputs the address assigned codes 916.

The label detecting means 905 detects local labels from the address assigned codes 916. On detecting a label that should be resolved by an instruction address, the label detecting means 905 obtains the provisional address of the instruction including this label. Conversely, on detecting a label that should be resolved by a PC relative value, the label detecting means 905 obtains the provisional addresses of the instruction including this label and the branch destination instruction. After this, the label detecting means 905 outputs the label information 906 that shows the instructions that include labels and information on values for resolving these labels.

The lower address subtraction means 907, the upper address subtraction means 910, and the address difference calculating means 912 calculate the PC relative values for labels, in the label information 906, that should be resolved by PC relative values.

The lower address subtraction means 907 subtracts the lower 3 bits of the provisional address of a branch instruction from the lower 3 bits of the provisional address of the branch destination instruction and outputs the resulting carry value 908 and lower subtraction result 909.

The upper address subtraction means 910 subtracts the upper 29 bits of the provisional address of a branch instruction and the carry value 908 calculated by the lower address subtraction means 907 from the upper 29 bits of the provisional address of the branch destination instruction and outputs the resulting upper subtraction result 911.

The address difference calculating means 912 finds the address difference 913 by setting the lower subtraction result 909 calculated by the lower address subtraction means 907 as the lower 3 bits and the upper subtraction result 911 calculated by the upper address subtraction means 910 as the upper 29 bits.

The label information resolving means 914 converts an instruction in the optimization processing code 903 including the present label into an instruction of a suitable size, based on an address that was estimated and assigned by the address assigning means 904 or the address difference 913 found by the address difference calculating means 912. If the assigned address or the address difference 913 can be expressed using no more than 13 bits, the label information resolving means 914 converts the instruction into a 21-bit instruction, or if not the label information resolving means 914 converts the instruction into a 42-bit instruction.

After the labels have been resolved, the label information resolving means 914 links the instruction sequences into packets of three instruction units and outputs the result as the optimized code 304.

The following describes a specific operation of the optimization apparatus 303.

Figure 10:
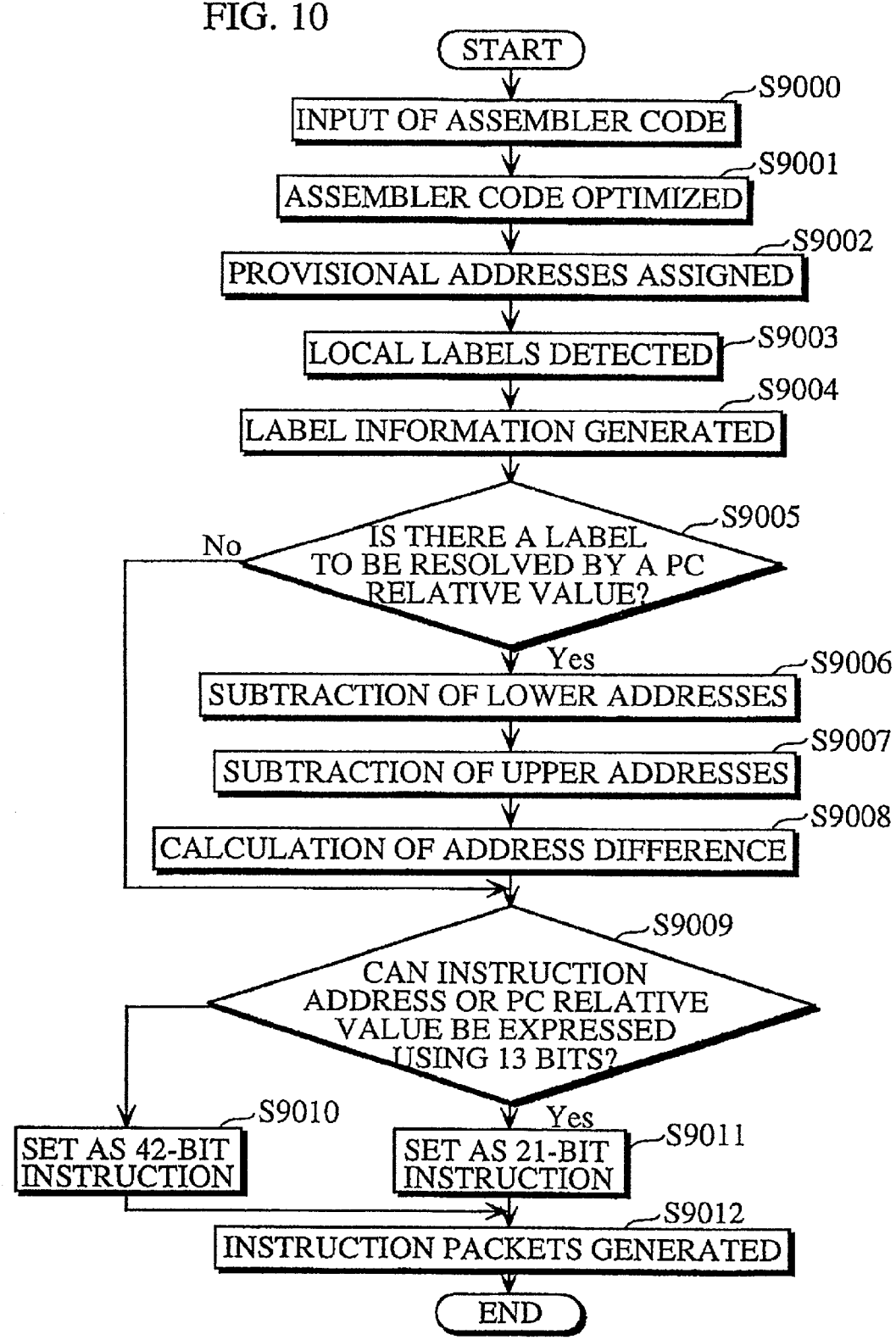
FIG. 10 is a flowchart showing the operation procedure of the optimization apparatus.

FIG. 10 is a flowchart showing the operation procedure of the optimization apparatus.

First, the code optimization apparatus 902 optimizes the assembler code 302 and generates optimization processing code 903. Part of the optimization processing code 903 generated by the code optimization apparatus 902 is shown in FIG. 11. Of the instructions in FIG. 11, "L1:mov r2,r1" 1000 shows the position of the label L1 and is an instruction that indicates a transfer from register r2 to register r1. The instruction "jsr f" is a function call that performs a relative branch to the label f (an external label). A return from the function call to this address is performed by a "ret" instruction. The instruction "add r0,r4" adds the values of registers r0 and r4 and stores the result in register r4. The instruction "and r1,r3" 1003 calculates a logical AND for the values in register r1 and r3 and stores the result in register r3. The instruction "mov L2,r2" 1004 transfers the address of the instruction located at the label L2 into the register r2 . The instruction "ld (r2 ),r0" 1005 transfers the data stored at the address stored in register r2 into the register r0 . The instruction "bra L1" 1006 performs an indirect branch to the label L1 (a local label). Note that in FIG. 11, the instructions that continue after instruction 1007 have been omitted, though these instructions do not include an instruction located at the label f (step S9001).

The address assigning means 904 assigns a provisional address to each instruction in the optimization processing code 903 and so generates address assigned codes 916. FIG. 12 shows the address assigned codes 916 generated from the optimization processing code 903 shown in FIG. 11. In this example, provisional addresses starting from the value "32'b00000800" have been assigned (step S9002).

The label detecting means 905 detects local labels in the address assigned codes 916 and outputs label information 906 composed of instructions that include the detected labels and information on the values used to resolve those labels. FIG. 13 shows the label information 906 that is generated from the address assigned codes 916 shown in FIG. 12. As shown in this figure, label L2 of instruction 1104 is detected as a label that should be resolved by an instruction address and label L1 is detected as a label that should be resolved by a PC relative value. Information showing the address for resolving the label L2 is appended to the instruction "mov L2,r2" that includes the label L2, and information showing the addresses of the branch destination instruction and branch instruction to be used for calculating a PC relative value is appended to the instruction "bra L1" that includes the label L1. Note that since the label f in instruction 1101 is an external label, it is not optimized (steps S9003, S9004).

When the label information 906 includes a label that should be resolved by a PC relative value, processing to calculate this PC relative value is performed. The lower address subtraction means 907 calculates the lower 3 bits of the value shown by the label L1 that is a PC relative value. The lower address subtraction means 907 subtracts the lower 3 bits "3'b010" of the provisional address "32'h00000812" of the branch instruction 1106 from the lower 3 bits "3'b000" of the provisional address "32'h00000800" of the branch destination instruction 1100. As a result, "1" is obtained as the carry value 908, and "3'b100" is obtained as the lower subtraction result 909 (steps S9005, S9006).

The upper address subtraction means 910 calculates the upper 29 bits of the value shown by the label L1 that is a PC relative value. The upper address subtraction means 910 subtracts the upper 29 bits "29'h00000102" of the provisional address of the branch instruction 1106 and the carry value 908 "1" generated by the lower address subtraction means 907 from the upper 29 bits "29'h00000100" of the provisional address of the branch destination instruction 1100. As a result, "29'h1fffffd" ("−3" in base 10, minus numbers being hereafter shown using a complement) is obtained as the upper subtraction result 911 (step S9007).

The address difference calculating means 912 finds the address difference, which is to say the PC relative value, by setting the lower subtraction result 909 as the lower bits and the upper subtraction result 911 as the upper bits. In this example, the address difference calculating means 912 sets "3'b100" as the lower bits and "29'h1fffffd" as the upper bits, giving an address difference of "32'hffffffec" (step S9008).

The label information resolving means 914 judges whether the value used to resolve the label in the label information 906 can be expressed by a 13-bit value. The value that resolves the label L2 shown in FIG. 13 is "32'h12345678", so that this value cannot be expressed as a 13-bit value, meaning that instruction 1104 including this label L2 will become a 42-bit instruction. On the other hand, the value used to resolve label L1 is "32'hffffffec", which can be expressed by a 13-bit value. Accordingly, the instruction 1106 that includes label L1 will become a 21-bit instruction (steps S9009, S9010, S9011).

The label information resolving means 914 links the instruction sequences into packets of three instruction units, based on the address assigned codes 916. When doing so, the label information resolving means 914 converts instructions that include labels into instructions of the determined size. Here, one instruction unit is used for 21-bit instructions, and two units are used for 42-bit instructions. After this, the label information resolving means 914 outputs the instruction sequences that it has converted into packets as the optimized code 304. FIG. 14 shows the optimized code 304 generated from the address assigned codes 916 shown in FIG. 12. In FIG. 14, each row shows the instructions that form one instruction packet, with the marks "| |" showing the boundaries between instructions in a packet. Curved brackets "( )" are used in this drawing to indicate 42-bit instructions that each occupy two units (step S9012).

As described above, addresses are estimated with a calculation method that uses a carry. In this way, a suitable optimization apparatus for a processor that uses a carry method can be achieved.

Note that the provisional addresses assigned by the address assigning means 904 and the PC relative values calculated by the address difference calculating means 912 are values that are estimated for determining the sizes of all instructions that include labels. There are cases when these estimates differ from the actual values, so that these values are not used hereafter in the processing.

Assembler

Figure 15:
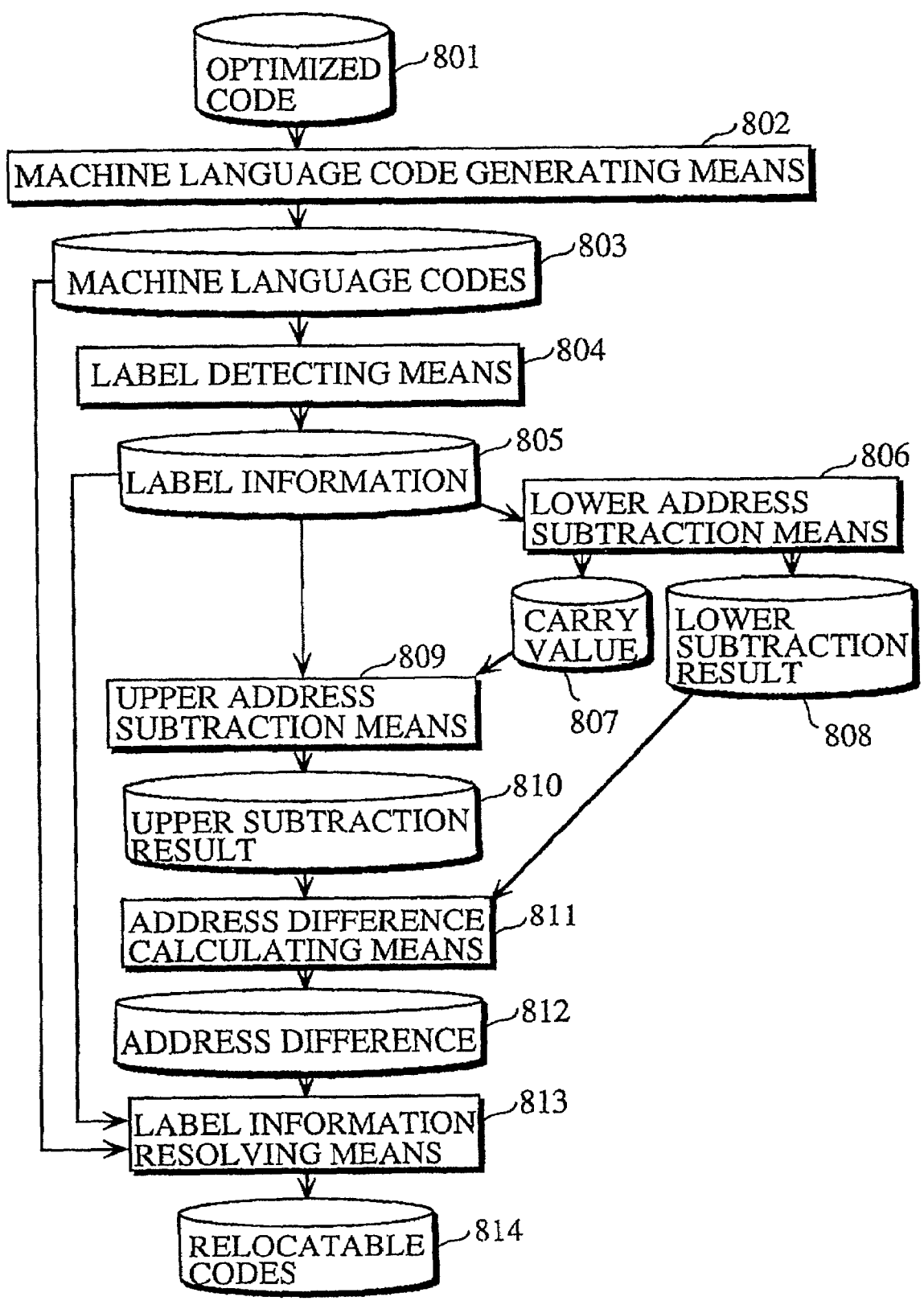
FIG. 15 is a block diagram that shows the construction of the assembler 305 shown in FIG. 5 and the input/output data related to the assembler 305.

FIG. 15 is a block diagram that shows the construction of the assembler 305 shown in FIG. 5 and the input/output data related to the assembler 305. This assembler 305 converts the optimized code 304 generated by the optimization apparatus 303 into relocatable codes 306 that have a relocatable address format. The assembler 305 includes a machine language code generating means 802, a label detecting means 804, a lower address subtraction means 806, an upper address subtraction means 809, an address difference calculating means 811, and a label information resolving means 813. The machine language code generating means 802 converts the optimized code 304 into machine language codes 803 that can be executed by the processor 309. However, labels whose values have not been resolved are not converted and are stored in the machine language codes 803 as they are. The machine language code generating means 802 assigns a packet address and an in-packet address to each machine language code. As described later, the labels are later resolved using these addresses.

The label detecting means 804 finds a label that should be resolved by a PC relative value, which is to say, a difference in addresses between two instructions and obtains the addresses of the branch instruction and the branch destination instruction. After this, the label detecting means 804 outputs label information 805 that is composed of the instructions that include labels and the values that resolve these labels.

To resolve the label information 805 obtained by the label detecting means 804, the lower address subtraction means 806, the upper address subtraction means 809, and the address difference calculating means 811 calculate a PC relative value as follows.

The lower address subtraction means 806 subtracts the lower 3 bits of the address of a branch instruction from the lower 3 bits of the address of the branch destination instruction and outputs the carry value 807 and the lower subtraction result 808.

The upper address subtraction means 809 subtracts the upper 29 bits of the address of a branch instruction and the carry value 807 calculated by the lower address subtraction means 806 from the upper 29 bits of the address of the branch destination instruction and outputs the resulting upper subtraction result 810.

The address difference calculating means 811 finds the address difference 812 by setting the lower subtraction result 808 calculated by the lower address subtraction means 806 as the lower 3 bits and the upper subtraction result 810 calculated by the upper address subtraction means 809 as the upper 29 bits.

The label information resolving means 813 replaces the labels in the machine language codes 803 with the address differences 812 calculated by the address difference calculating means 811, and outputs the resulting relocatable codes 306.

The following explains a specific example of the processing of the assembler 305 on receiving an input of the optimized code 304 of FIG. 14 that has been outputted by the optimization apparatus 303.

Figure 16:
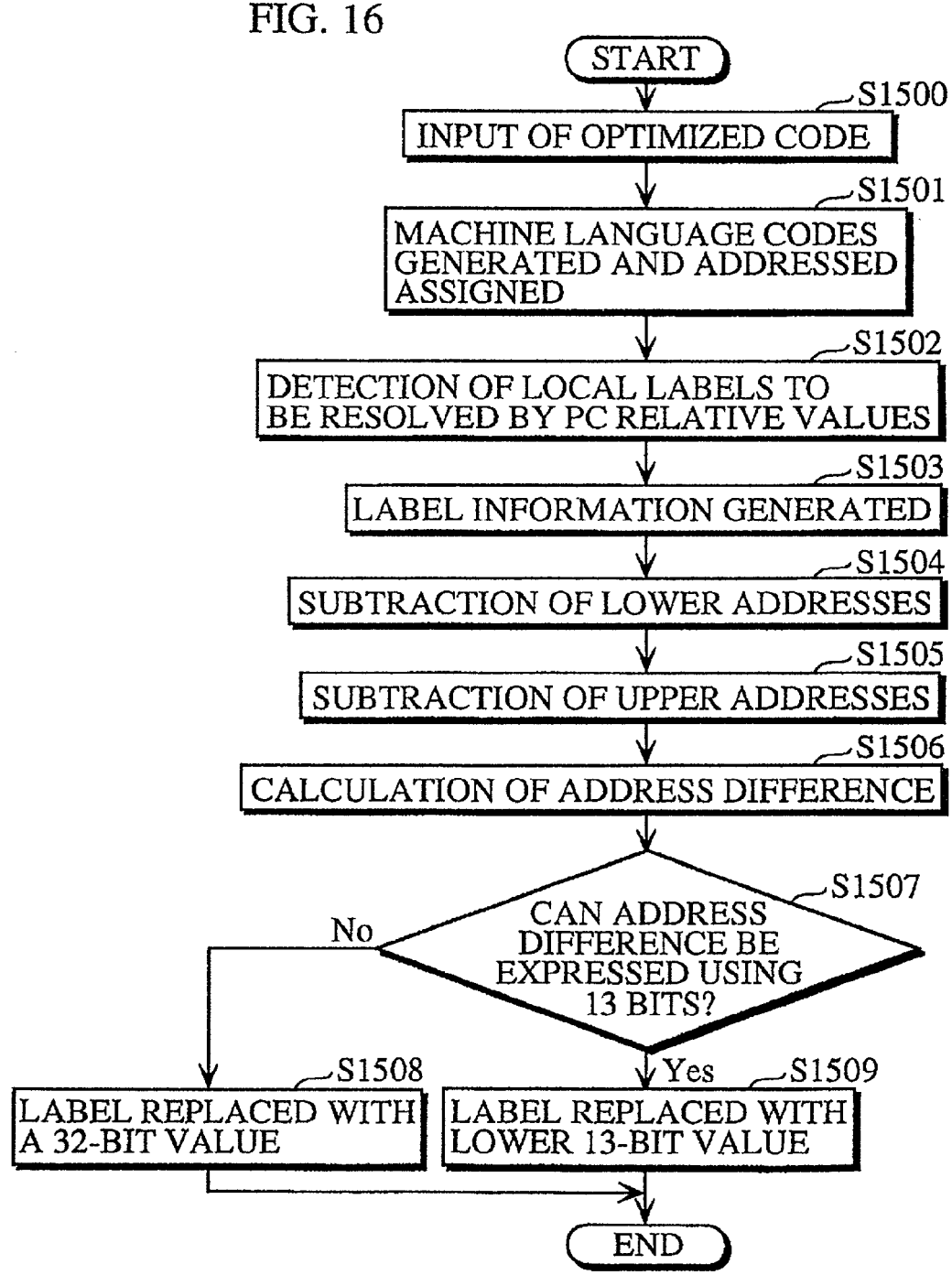
FIG. 16 is a flowchart showing the operation of the assembler.

FIG. 16 is a flowchart showing the operation of the assembler.

First, the machine language code generating means 802 converts each packet in the optimized code 304 into machine language codes 803 that are suited to the processor 309. However, the machine language code generating means 802 does not convert labels whose values have not been resolved, so that these labels are stored as they are in the machine language codes 803. After this, the machine language code generating means 802 assigns packet addresses (hereafter also called "local packet addresses") and in-packet addresses to each instruction in the machine language codes 803. FIG. 17 shows the machine language codes 803 that are generated from the optimized code 304 shown in FIG. 14. Note that the actual machine language codes are expressed in binary as sequences of zeros and ones, though for ease of understanding these machine language codes are shown in FIG. 17 in mnemonic form. The parallel execution boundary information 100 and the format information 101 will also be clear at this stage, but are not illustrated to simplify the figure. In FIG. 17, packet addresses (local packet addresses) are assigned starting from the value "29'h00000000". The label f in the instruction "jsr f" in packet 1300, the label L2 in the instruction "mov L2,r2" in packet 1301, and the label L1 in the instruction "bra L1" in packet 1302 have not yet been resolved, so that these instructions are not converted (steps S1500, S1501).

Next, the label detecting means 804 detects labels, out of the unresolved labels in the machine language codes 803, which are local labels that should be resolved by a PC relative value, and obtains the address of the instruction including the label, which is to say, the branch instruction, and the address of the branch destination instruction. The label detecting means 804 then outputs label information 805 that includes information showing the instruction including the label and the value that resolves the label. FIG. 18 shows the label information 805 that is generated from the machine language codes shown in FIG. 17. Here, label L1 is detected as a local label that should be resolved by a PC relative value, "32'h00000012" is obtained as the address of the branch instruction, and "32'h00000000" is obtained as the address of the branch destination instruction (steps S1502, S1503).

The lower address subtraction means 806 then calculates the lower bits of the value L1 that is a PC relative value. The lower address subtraction means 806 subtracts the lower 3 bits "3'b010" of the address "32'h00000012" of the branch instruction 1409 from the lower 3 bits "3'b000" of the address "32'h00000000" of the branch destination instruction 1401. As a result, "1" is obtained as the carry value 807 and "3'b100" is obtained as the lower subtraction result 808 (step S1504).

Next, the upper address subtraction means 809 calculates the upper bits of the value L1 that is a PC relative value. The upper address subtraction means 809 subtracts the upper 29 bits "29'h00000002" of the address of the branch instruction 1409 and the carry value 807 "1" from the upper 29 bits "29'h00000000" of the address of the branch destination instruction 1401. As a result, "29'h1ffffffd" ("−3" in base 10, minus numbers being hereafter shown using a complement) is obtained as the upper subtraction result 810 (step S1505).

The address difference calculating means 811 finds the address difference, which is to say the PC relative value, by setting the lower subtraction result 808 as the lower bits and the upper subtraction result 810 as the upper bits. In this example, the address difference calculating means 811 sets "3'b100" as the lower bits and "29'h1ffffffd" as the upper bits, giving an address difference of "32'hffffffec" (step S1506).

The label information resolving means 813 judges whether the address difference 812 can be expressed by only its lower 13 bits. If so, the label information resolving means 813 sets the lower 13 bits of the address difference 812 as the PC relative value, or if not, the label information resolving means 813 sets the entire address difference 812 as the PC relative value. As a result, a label in the machine language codes 803 is converted into a PC relative value. The address difference that resolves label L1 in the label information in FIG. 17 is "32'hffffffec", which can be expressed by the lower 13-bit value "131fec", so that the label L1 in the machine language codes shown in FIG. 17 is converted into the lower 13-bit value. FIG. 19 shows the relocatable codes that are generated from the machine language codes 803 shown in FIG. 17. In FIG. 19, the instruction 1609 has been produced by converting the label L1 into a PC relative value. FIG. 19 shows the parallel execution boundary information 100 and format information 101 of each instruction that had already been established when the machine language codes 803 were outputted, and also shows the unused bit in each instruction packet (steps S1507, S1508, S1509).

As described above, by finding a PC relative value by performing address calculation according to a carry method, an assembler corresponding to a processor that uses a carry method can be realized.

Linker

Figure 20:
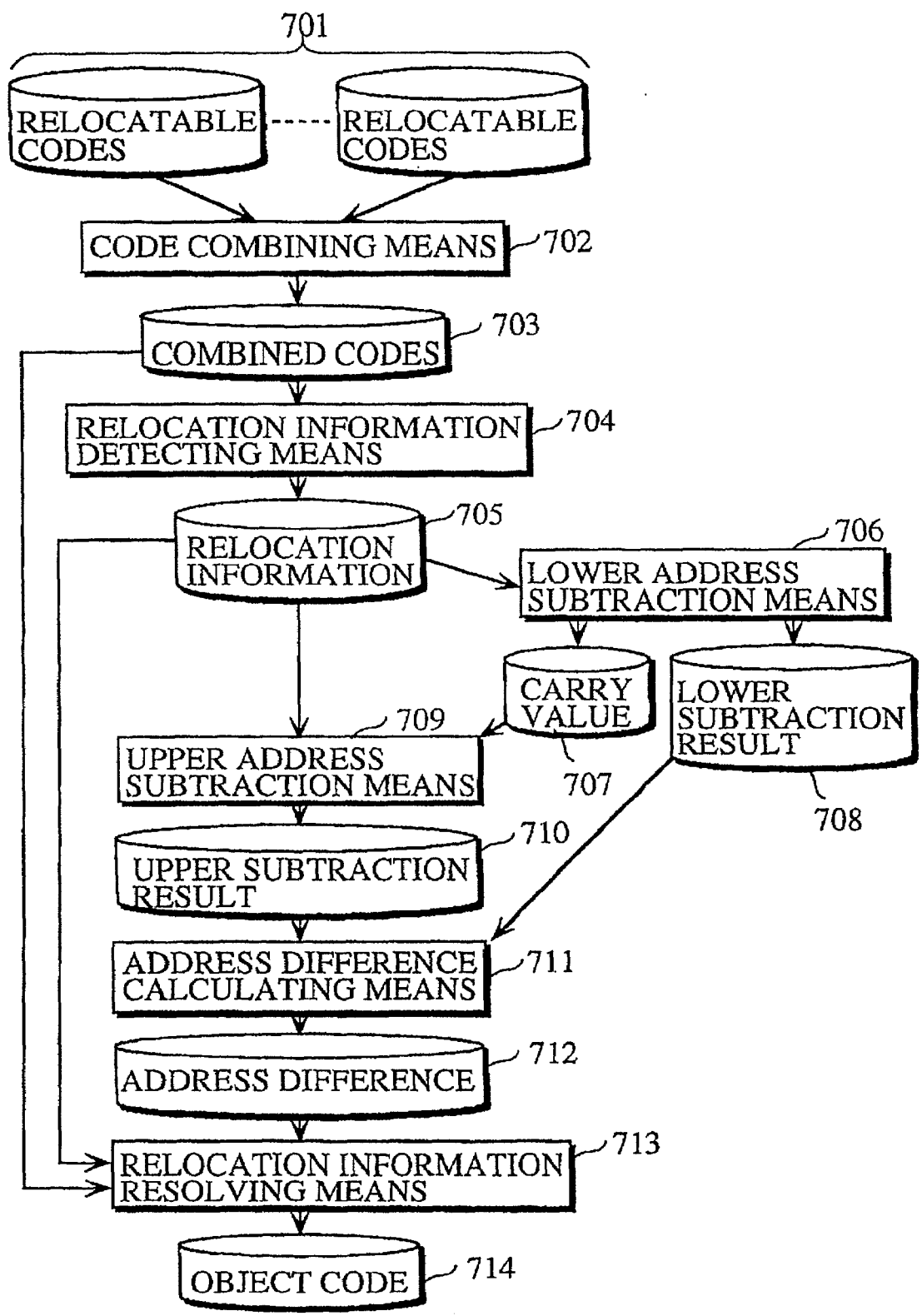
FIG. 20 is a block diagram showing the construction of the linker 307 and the I/O (input/output) data of the linker 307.

FIG. 20 is a block diagram showing the construction of the linker 307 shown in FIG. 5 and the I/O (input/output) data of the linker 307. This linker 307 combines a plurality of relocatable codes 701, determines the addresses of each instruction, and outputs the object code 714 that is executable by the processor 309 and is in absolute address format. The linker 307 includes the code combining means 702, the relocation information detecting means 704, the lower address subtraction means 706, the upper address subtraction means 709, the address difference calculating means 711, and the relocation information resolving means 713.

The code combining means 702 combines a plurality of inputted relocatable codes 701 and determines the addresses of all instructions. The code combining means 702 then resolves the labels that should be resolved by instruction addresses using the determined addresses and outputs the combined codes 703 that result from its operation.

The relocation information detecting means 704 searches for external labels that should be resolved by PC relative addresses and obtains the addresses of branch instructions and the branch destination instructions. After doing so, the relocation information detecting means 704 outputs relocation information 705 includes information showing instructions that include labels and values to be used to resolve the labels. To resolve the resulting relocation information 705, the lower address subtraction means 706, the upper address subtraction means 709, and the address difference calculating means 711 calculate PC relative values, as described below.

The lower address subtraction means 706 subtracts the lower 3 bits of the address of the branch instruction from the lower 3 bits of the address of the branch destination instruction, and so generates a carry value 707 and a lower subtraction result 708.

The upper address subtraction means 709 subtracts the upper 29 bits of the address of the branch instruction and the carry value 707 generated by the lower address subtraction means 706 from the upper 29 bits of the address of the branch destination instruction, and so generates the upper subtraction result 710.

The address difference calculating means 711 sets the lower subtraction result 708 calculated by the lower address subtraction means 706 as the lower 3 bits and the upper subtraction result 710 calculated by the upper address subtraction means 709 as the upper 29 bits to generate the address difference 712.

The relocation information resolving means 713 replaces labels in the combined codes 703 with address differences 712 calculated by the address difference calculating means 711, and outputs the resulting object code 308.

The operation of the linker 307 is explained below using an example where the relocatable codes 306 shown in FIG. 19 that have been outputted by the assembler 305 have been inputted.

Figure 21:
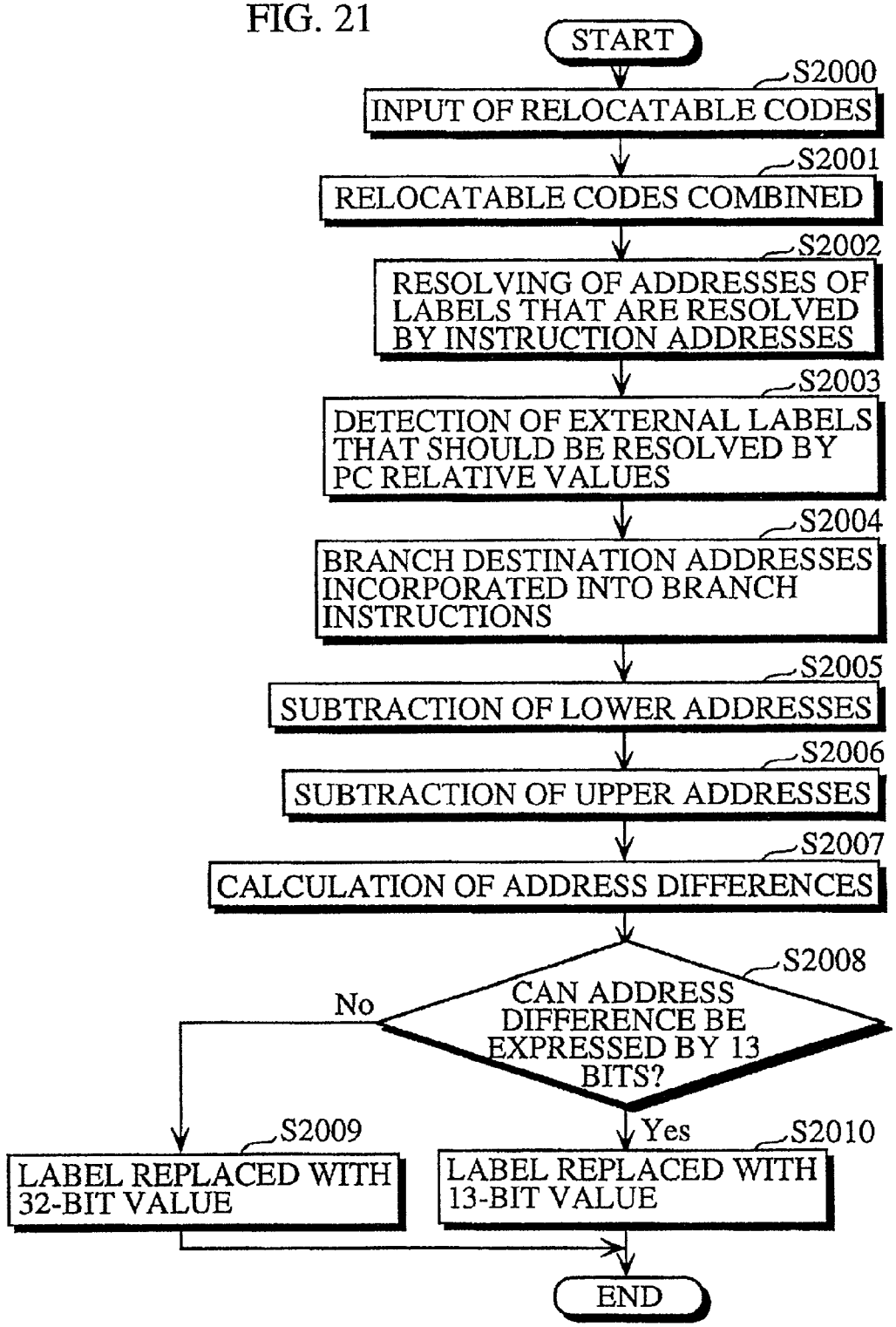
FIG. 21 is a flowchart showing the operation of the linker 307.

FIG. 21 is a flowchart showing the operation of the linker 307.

First, the code combining means 702 combines a plurality of relocatable codes 701. FIG. 23 shows the state when the relocatable codes 814 shown in FIG. 19 have been combined with the relocatable code shown in FIG. 22. The code combining means 702 combines these relocatable codes with the packet address of the first relocatable code in FIG. 22 as "29'h000000001" and the packet address of the first relocatable code in FIG. 19 as "29'h000000001" (step S2000, S2001).

The addresses of all instructions are determined in this way, so that the code combining means 702 can resolve the addresses of labels that should be resolved by instruction addresses and then output the resulting combined codes 703. FIG. 23 shows that the address of label L2 in instruction 1810 "mov L2,r2" is the starting address of instruction packet 1815. This address has been set at "32'h12345680", so that the code combining means 702 uses this value to replace the label L2. FIG. 24 shows the resulting combined codes 703. In instruction 1910 in FIG. 24, the label L2 has been replaced with this address "32'h12345680" (step S2002).

Next, the relocation information detecting means 704 finds external labels in the combined codes 703 that should be resolved by PC relative values and extracts the addresses of the instructions that include these labels and the addresses of the instructions where these labels are located, which is to say, the addresses of branch instructions and branch destination instructions. After this, the relocation information detecting means 704 outputs relocation information 705 that is composed of information showing the instructions including labels and the values to be used to resolve these labels. FIG. 25 shows the label information that is generated from the combined codes 703 shown in FIG. 24. Here, label f is found as an external label that should be resolved by a PC relative value, so that "32'h00000000" is obtained as the address of a branch instruction and "32'h00000000" as the address of the branch destination instruction (steps S2003, S2004).

The lower address subtraction means 706 then calculates the lower bits of the value f that is a PC relative value. The lower address subtraction means 706 subtracts the lower 3 bits "3'b010" of the address "32'h00000000a" of the branch instruction 1906 from the lower 3 bits "3'b000" of the address "32'h00000000" of the branch destination instruction 1901. As a result, "1" is obtained as the carry value 707 and "3'b100" is obtained as the lower subtraction result 708 (step S2005).

Next, the upper address subtraction means 709 calculates the upper bits of the value f that is a PC relative value. The upper address subtraction means 709 subtracts the upper 29 bits "29'h00000002" of the address "32'h00000000a" of the branch instruction 1906 and the carry value 707 "1" from the upper 29 bits "29'h00000000" of the address of the branch destination instruction 1901. As a result, "29'h1ffffffe" is obtained as the upper subtraction result 710 (step S2006).

The address difference calculating means 711 finds the address difference 712, which is to say the PC relative value, by setting the lower subtraction result 708 as the lower bits and the upper subtraction result 710 as the upper bits. In this example, the address difference calculating means 811 sets "3'b100" as the lower bits and "29'h1fffffe" as the upper bits, giving an address difference of "32'hffffff4" (step S2007).

Next, the relocation information resolving means 713 converts a label in the combined codes 703 into a PC relative value, setting the lower 13 bits of the address difference 712 as the PC relative value if this address difference 712 can be expressed by the lower 13 bits, or otherwise setting the entire address difference 712 as the PC relative value. The address difference that resolves the label f in the relocation information in FIG. 24 is "32'hffffff4", which can be expressed by the lower 13-bit value "13'h1ff4", so that the label f in the combined codes 703 shown in FIG. 23 is converted into this lower 13-bit value to produce the object code. The resulting object code is shown in FIG. 26. In instruction 2106 in FIG. 26, the label f has been converted into the lower 13-bit value "13'h1ff4" (steps S2008, S2009, S2010).

As described above, the present linker finds PC relative values using an address calculation including a carry, and so is suited to a processor that uses a carry.

Specific Operation of the Processor

The following describes the operation of the processor when the object code shown in FIG. 26 has been stored in the instruction memory 407.

At the start of execution of this object code, the upper PC 403 is set at "29'h00000000" and the lower PC 404 is set at "3'b000". The prefetch upper counter 410 receives an input from the upper PC 403 and so is set at "29'h00000000".

The read of instructions from the instruction memory 407 is performed in packet units according to the value in the prefetch upper counter 410. In detail, instruction packet 2100 that is indicated by the prefetch upper counter 410 is read from the instruction sequence stored in the instruction memory 407 and is stored in the instruction buffer 408. The value of the prefetch upper counter 410 is incremented by one in each cycle, and so here becomes "29'h00000000". Hereafter, an instruction packet indicated by the prefetch upper counter 410 is read from the instruction memory 407 and written into the instruction buffer 408 in each cycle.

The following explains the operations for decoding and executing instructions for the case when instruction packet 2104 is indicated by the upper PC 403 and instruction 2107 in instruction packet 2104 is indicated by the lower PC 404. The instructions stored in the instruction buffer 408 are interpreted by the instruction decoders 409*a*~409*c*. The first instruction decoder 409*a* receives an input of the first unit, unit 2107, in the instruction packet 2104 and investigates whether unit 2107 is a one-unit instruction and whether there is a parallel execution boundary. Since unit 2107 is a one-unit instruction and there is no parallel execution boundary, the second instruction decoder 409*b* receives an input of the next unit, unit 2109, and investigates whether unit 2109 is a one-unit instruction and whether there is a parallel execution boundary. Since unit 2109 is a one-unit instruction and there is no parallel execution boundary, the third instruction decoder 409*c* receives an input of the next unit and investigates whether this next unit is a one-unit instruction and whether there is a parallel execution boundary. Since this unit is not a one-unit instruction, the third instruction decoder 409*c* also receives an input of the following unit. The third instruction decoder 409*c* then finds that this following unit includes a parallel execution boundary. As a result, the instructions 2107, 2109, and 2110 are executed in parallel.

The first instruction decoder 409*a* decodes the instruction "add r0 ,r4" and outputs control signals to the first calculator 401*a*. The first calculator 401*a* adds the values of registers r0 and r4 and stores the result in register r4. The second instruction decoder 409*b* decodes the instruction "and r1,r3" and outputs control signals to the second calculator 401*b*. The second calculator 401*b* performs a logical operation on the values of registers r1 and r3 , and stores the result in register r3 . The third instruction decoder 409*c* decodes the instruction "mov 32'h12345680,r2" and so has the immediate "32'h12345680" transferred into register r2.

In this case, the instruction decoders 409*a*~409*c* inform the INC 412 that a total of four instruction units have been executed. The INC 412 increments the values in upper PC 403 and the lower PC 404 by four units. As a result, the lower PC 404 becomes "3'b$_{000}$", a carry of two to the upper PC 403 is generated, and the upper PC 403 becomes "29'h00000003". This means that the first instruction to be executed in the next cycle is instruction 2112.

The first instruction decoder 409*a* receives an input of the first unit, unit 2112, and investigates whether unit 2112 is a one-unit instruction and whether there is a parallel execution boundary. Since unit 2112 is a one-unit instruction and there is no parallel execution boundary, the second instruction decoder 409*b* receives an input of the next unit, unit 2113, and investigates whether unit 2113 is a one-unit instruction and whether there is a parallel execution boundary. Here, the second instruction decoder 409*b* finds that unit 2109 is a one-unit instruction and that there is a parallel execution boundary. As a result, the processor 309 finds that instructions 2112 and 2113 can be executed in parallel.

The first instruction decoder 409*a* decodes the instruction "ld (r2),r0 ", has the operand data, which has the value in register r2 as the operand address, read from the data memory 406 and stored in register r0. The second instruction decoder 409*b* decodes the instruction "bra 13'h1fec", and, since this is a branch instruction, updates the values in the upper PC 403 and lower PC 404 using the address of the branch destination instruction.

First, the address indicated by the upper PC 403 and lower PC 404 is amended. While a PC relative value shows the difference in addresses between a branch instruction and its branch destination instruction, the upper PC 403 and lower PC 404 show the address of the first address to be executed in the same cycle as the branch instruction, so that the upper PC 403 and lower PC 404 are amended so that they indicate the address of the branch instruction. In detail, the INC 412 increments the values of the upper PC 403 and lower PC 404 by one unit to show that the branch instruction 2113 is preceded by one instruction unit, the first instruction 2112. As a result, the lower PC 404 becomes "3'b010" and the upper PC 403 stays at "29'h00000003".

Following this, the upper PC calculator 411 and the lower PC calculator 405 add the PC relative value "13'h1fec" obtained by the second instruction decoder 409*b* to the upper PC 403 and the lower PC 404. Here, the sign-extended 32-bit value "32'hffffffec" is used as the PC relative value. This addition is split into additions of the upper 29 bits and the lower 3 bits.

The lower PC calculator 405 adds the lower 3 bits "3'b100" of the PC relative value to the value "3'b010" of the lower PC 404. As a result, a carry of one and the lower calculation result "3'b000" are obtained. The lower PC calculator 405 sends the carry to the upper PC calculator 411, and sends the lower calculation result to the lower PC 404.

Next, the upper PC calculator 411 adds the upper 29 bits "29'h1fffffd" of the PC relative value and the carry value "1" received from the lower PC calculator 405 to the value "29'h00000003" of the upper PC 403. The upper PC calculator 411 sends the upper calculation result of "29'h00000001" to the upper PC 403, which sends the value on to the prefetch upper counter 410. As a result of this processing, the prefetch upper counter 410 is set at "29'h00000001", so that the next instruction packet to be prefetched will be instruction packet 2104. Also, since the upper PC 403 is "29'h00000001" and the lower PC 404 is "3'b000", the first instruction to be executed in the next cycle is instruction 2105.

Hereafter, codes in the object code are successively read and executed in the same way, so that no explanation will be given for the other instructions.

This completes the detailed explanation of the constructions of the processor 309, linker 307, assembler 305 and optimization apparatus 303 shown in FIG. 5. A conventional compiler can be used as the compiler 301, so that no explanation of such will be given.

Note that while the processor of this embodiment includes three instruction decoders 409a~409c and three calculators 401a~401c, the present invention is not limited to this construction, so that only one instruction decoder and one calculator may by provided. It is also possible for the functions of the optimization apparatus 303 to be incorporated into the compiler 301, and to have the object code 308 generated from the source code 300 by the compiler 301, the assembler 305, and the linker 307.

In the present embodiment, the prefetch lower counter 413 was described as having the fixed value of "3'b000", though this need not be the case. As one example, this value may be incremented by one in each cycle. This results in one byte of data being read from the instruction memory 407 and written into the instruction buffer 408 in each cycle.

Second Embodiment

The second embodiment of the present invention relates to a modification of the processor, optimization apparatus, assembler, and linker of the first embodiment. This modification uses a different value as the PC relative value for resolving labels in branch instructions.

In the first embodiment, the PC relative value in a branch instruction is a difference in addresses between the branch instruction and the branch destination instruction, while in this second embodiment, the PC relative value in a branch instruction is a difference between the address of the branch destination instruction and the address of the first instruction in same set of instructions as the branch instruction.

In this way, the PC relative value has a slightly different meaning than in the present embodiment. However, if the devices used to generate a program (i.e., the optimization apparatus 303, assembler 305, and linker 307 that calculate the PC relative value) use the same meaning as the device that executes the program (i.e., a processor that calculates an address based on the PC relative value), the processor will be able to correctly change the program counter to the address of a branch destination instruction when executing a branch instruction.

The following explains the optimization apparatus 303, assembler 305, linker 307, and processor.

The label detecting means 905 of the optimization apparatus 303 generates the label information 906 for labels that should be resolved by PC relative values in the following way. Instead of generating label information after obtaining the provisional addresses of the branch instruction and the branch destination instruction in the same way as in the first embodiment, the label detecting means 905 generates the label information 906 after obtaining the provisional addresses of the branch destination instruction and the address of the first instruction in the same set of instructions as the branch instruction. In the same way as in the first embodiment, this label information 906 is then used to calculate the address difference 913 that is the difference between two provisional addresses and is used in the optimized code 304. The assembler and linker also operate in this way.

The following describes a specific example of the object code 308 generated in this embodiment.

The assembler 305 replaces the label L1 in instruction 1409 in the machine language codes shown in FIG. 17 with the subtraction value "13h'1ff0" produced by subtracting the address "32'h00000010" of instruction 1408, which is the first instruction in same set of instructions as instruction 1409, from the address "32'h00000000" of the branch destination instruction. In the same way, the linker 307 replaces the label f in instruction 1906 in the combined codes shown in FIG. 24 with the subtraction value "13'h1ff8" produced by subtracting the address "32'h00000008" of the instruction 1907, which is the first instruction in same set of instructions as instruction 1906, from the address "32'h00000000" of the branch destination instruction. FIG. 27 shows that the PC relative value of instruction 2213 differs from that shown in FIG. 26.

The following describes the processor of the present embodiment.

The processor 309 executes object code that have been generated as described above. When the processor 309 executes a branch instruction, the PC relative value in the branch instruction is a difference in addresses between the branch destination instruction and the first instruction in same set of instructions as the branch instruction. Accordingly, the processor 309 does not amend the values of the upper PC 403 and lower PC 404 and, in the same way as in the first embodiment, adds the PC relative value to the values in the upper PC 403 and lower PC 404 and updates the values in the upper PC 403 and lower PC 404 using the addition results. When this processor 309 executes the object code shown in FIG. 27, the execution of instruction 2213 results in the PC relative value "13h1ff8" being added to the present PC "32'h00000008", resulting in the PC being updated to "32'h00000000".

As described above, the processor of the present embodiment does not need to amend the value of the program counter in the same way as in the first embodiment whenever a branch instruction is executed. The address of a branch destination instruction can instead be obtained by directly adding a PC relative value to the PC. This reduces the total execution time.

Third Embodiment

The third embodiment of the present invention relates to a processor that can indicate the execution position of an instruction by fully utilizing the lower 3 bits of instruction addresses.

In the first embodiment, the lower 3 bits of the instruction address are used to indicate a position that is one of three units. In the present embodiment, however, full use is made of these 3 bits by having them indicate one of eight units.

FIG. 28A shows the construction of an instruction packet in the present embodiment. This instruction packet is composed of eight instruction units. Each instruction unit in an instruction packet is 8 bits long, so that the total length of one instruction packet is 64 bits. The processor in this embodiment reads one instruction packet (64 bits) in one cycle.

FIG. 28B shows the types of instructions used in this embodiment. Each instruction is composed of 8-bit instruction units, with there being one-, two-, three-, four-, five-, and six-unit instructions.

FIG. 28C shows the relation between in-packet addresses and the instruction units in a packet. In the same way as in the first embodiment, a position in an instruction packet is indicated by the lower 3 bits of an instruction address. As shown in FIG. 28C, the in-packet address "3'b000" indicates the first unit, the in-packet address "3'b001" indicates the second unit, the in-packet address "3'b010" indicates the third unit, the in-packet address "3'b011" indicates the fourth unit, the in-packet address "3'b100" indicates the fifth unit, the in-packet address "3'b101" indicates the sixth unit, the in-packet address "3'b110" indicates the seventh unit, and the in-packet address "3'b000" indicates the eighth unit.

As described above, the processor of the present embodiment indicates the execution position of an instruction making full use of the lower 3 bits of the instruction address. As a result, instructions can be executed with a greater variation of execution units for one cycle.

Fourth Embodiment

The fourth embodiment of the present invention relates to a method for calculating instruction addresses without using a carry.

The first embodiment teaches a processor for executing a program, and an optimization apparatus, assembler, and linker for generating a suitable program. All of these devices use a common method for calculating an instruction address using a carry. This has the effect that the processor can correctly generate the address of a branch destination instruction using a PC relative value. However, this effect can be achieved if the processor, optimization apparatus, assembler, and linker use a common address calculation method that does not use a carry. This present embodiment relates to such a calculation method that calculates addresses without using a carry.

This calculation method that does not use a carry resembles the calculation method in the first embodiment in that the calculation of address is performed separately for the upper 29 bits and lower 3 bits. However, the present method differs by not using a carry.

The following explains the method by which the processor finds the address of a branch destination instruction by adding the address of a branch instruction and a PC relative value. The lower PC calculator 405 shown in FIG. 6 adds the lower 3 bits of the address of the branch instruction and the lower 3 bits of the PC relative value. FIG. 29A is an addition table showing the addition rules for adding the lower 3 bits of the address of the branch instruction and the lower 3 bits of the PC relative value in the present calculation method. As shown in the figure, this calculation differs from a normal addition of binary values in that it cycles between the three states "3'b000", "3'b010", and "3'b100". Note that no carry is generated.

The upper PC calculator 411 shown in FIG. 6 adds the upper 29 bits of the address of the branch instruction and the upper 29 bits of the PC relative value. This is a normal addition of binary values.

The results of the above additions form the address of a branch destination instruction. In detail, the addition result for the lower 3 bits is set in the lower PC 404 and the addition result for the upper 29 bits is set in the upper PC 403.

The following explains the method used by the optimization apparatus, assembler, and linker to calculate the PC relative value, which is to say, to subtract the address of the branch destination instruction from the address of the branch instruction. This subtraction is split into an upper 29 bits and lower 3 bits like the addition performed by the processor. The lower address subtraction means 907 of the optimization apparatus 303, the lower address subtraction means 806 of the assembler 305, and the lower address subtraction means 706 of the linker 307 subtract the lower 3 bits of the address of a branch instruction from the lower 3 bits of the address of the branch destination instruction. FIG. 29B is a subtraction table showing the subtraction rules for subtracting the lower 3 bits of the address of the branch instruction from the lower 3 bits of the address of the branch destination instruction. As shown in the figure, this calculation differs from a normal subtraction of binary values in that it cycles between the three states "3'b000", "3'b010", and "3'b100". Note that no carry is generated.

The upper address subtraction means 910 of the optimization apparatus 303, the upper address subtraction means 809 of the assembler 305, and the upper address subtraction means 709 of the linker 307 subtract the upper 29 bits of the address of the branch instruction from the upper 29 bits of the address of the branch destination instruction. This is a normal subtraction of binary values.

The PC relative value is then found by setting the result of the above subtraction for the lower 3 bits as the lower 3 bits and the result of the above subtraction for the upper 29 bits as the upper 29 bits.

FIG. 30 shows the object code that is generated by the above address calculation method of the present embodiment that does not use a carry. The PC relative values of instructions 2406 and 2413 differ to those in FIG. 26. The following explains the calculation of the PC relative value of instruction 2406.

The lower address subtraction means 706 subtracts the lower 3 bits "3'b010" of the address of instruction 2406 from the lower 3 bits "3'b000" of the address of instruction 2401 in accordance with the subtraction table shown in FIG. 29B. This produces the lower subtraction result "3'b100".

The upper address subtraction means 709 subtracts the upper 29 bits "29'h00000001" of the address of instruction 2406 from the upper 29 bits "29'h00000000" of the address of instruction 2401. This produces the upper subtraction result "29'h1ffffff".

The address difference calculating means 711 generates the address difference "32'h1ffffffc" by setting the upper subtraction result "29'h1ffffff" as the upper 29 bits and the lower subtraction result "3'b100" as the lower 3 bits.

The relocation information resolving means 713 judges that the address difference "32'h1ffffffc" can be expressed by just the lower 13 bits "13'h1ffc" and so replaces a label with this value "13'h1ffc" as a PC relative value to generate instruction 2406.

The processor 309 executes the object code generated as described above. When executing a branch instruction, the processor 309 adds the upper PC 403 and lower PC 404, which have been amended to correctly indicate the branch instruction, to the PC relative value in the branch instruction without generating a carry.

When the processor 309 executes instruction 2406 in the object code shown in FIG. 30, the lower PC calculator 405 adds the amended lower PC 404 "3'b010" and the lower 3 bits "3'b100" of the PC relative value and updates the lower PC 404 to the resulting addition value "3'b000". The upper PC calculator 411 adds the amended upper PC 403 "29'h00000001" and the upper 29 bits "29'h1fffffff" of the PC relative value and updates the lower PC 404 to the resulting addition value "29'h00000000".

As described above, the present calculation method can calculate addresses without a carry being sent between the lower PC calculator 405 and the upper PC calculator 411. This means that address calculation can be performed with a simpler hardware construction.

Fifth Embodiment

The fifth embodiment of the present invention teaches a method for calculating instruction addresses using absolute values.

This calculation method that uses absolute values resembles the calculation method in the first embodiment in that the calculation of address is performed separately for the upper 29 bits and lower 3 bits. However, the present method differs from the carry method in that the value of the lower 3 bits of an instruction address are set as the lower 3 bits of the calculation result.

The following explains the method by which the processor finds the address of a branch destination instruction by adding the address of a branch instruction and a PC relative value. The lower PC calculator 405 shown in FIG. 6 adds the lower 3 bits of the address of the branch instruction and the lower 3 bits of the PC relative value. FIG. 31A is an addition table showing the addition rules for adding the lower 3 bits of the address of the branch instruction and the lower 3 bits of the PC relative value in the present calculation method that uses absolute values. As shown in the figure, the lower 3 bits of the PC relative value are set as the lower 3 bits of the addition result.

The upper PC calculator 411 shown in FIG. 6 adds the upper 29 bits of the address of the branch instruction and the upper 29 bits of the PC relative value. This is a normal addition of binary values.

The results of the above additions form the address of a branch destination instruction. In detail, the addition result for the lower 3 bits is set in the lower PC 404 and the addition result for the upper 29 bits is set in the upper PC 403.

The following explains the method used by the optimization apparatus 303, assembler 305, and linker 307 to calculate the PC relative value, which is to say, to subtract the address of the branch destination instruction from the address of the branch instruction. This subtraction is split into an upper 29 bits and lower 3 bits, like the addition performed by the processor. The lower address subtraction means 907 of the optimization apparatus 303, the lower address subtraction means 806 of the assembler 305, and the lower address subtraction means 706 of the linker 307 subtract the lower 3 bits of the address of a branch instruction from the lower 3 bits of the address of the branch destination instruction. FIG. 31B is a subtraction table showing the subtraction rules for subtracting the lower 3 bits of the address of the branch instruction from the lower 3 bits of the address of the branch destination instruction in this calculation method that uses absolute values. As shown in the figure, the lower 3 bits of the branch destination address are set as the subtraction result for the lower 3 bits.

The upper address subtraction means 910 of the optimization apparatus 303, the upper address subtraction means 809 of the assembler 305, and the upper address subtraction means 709 of the linker 307 subtract the upper 29 bits of the address of the branch instruction from the upper 29 bits of the address of the branch destination instruction. This is a normal subtraction of binary values.

The PC relative value is then found by setting the result of the above subtraction for the lower 3 bits as the lower 3 bits and the result of the above subtraction for the upper 29 bits as the upper 29 bits.

FIG. 32 shows the object code that is generated by the above address calculation method of the present embodiment that uses absolute values. The PC relative values of instructions 2606 and 2613 differ to those in FIG. 26. The following explains the calculation of the PC relative value of instruction 2606.

The lower address subtraction means 706 subtracts the lower 3 bits "3'b010" of the address of instruction 2406 from the lower 3 bits "3'b000" of the address of instruction 2401 in accordance with the subtraction table shown in FIG. 31B. This produces the lower subtraction result "3'b000".

The upper address subtraction means 709 subtracts the upper 29 bits "29'h00000001" of the address of instruction 2406 from the upper 29 bits "29'h00000000" of the address of instruction 2401. This produces the upper subtraction result "29'h1fffffff".

The address difference calculating means 711 generates the address difference "32'h1ffffff8" by setting the upper subtraction result "29'h1fffffff" as the upper 29 bits and the lower subtraction result "3'b000" as the lower 3 bits.

The relocation information resolving means 713 judges that the address difference "32'h1ffffff8" can be expressed by just the lower 13 bits "13'h1ff8" and so replaces a label with this value "13'h1ff8" as a PC relative value to generate instruction 2606.

The processor 309 executes the object code generated as described above. When executing a branch instruction, the processor 309 adds the upper PC 403 and lower PC 404, which have been amended to correctly indicate the branch instruction, to the PC relative value in the branch instruction using the present absolute value method.

When the processor 309 executes instruction 2606 in the object code shown in FIG. 32, the lower PC calculator 405 adds the amended lower PC 404 "3'b010" and the lower 3 bits "3'b000" of the PC relative value and updates the lower PC 404 to the resulting addition value "3'b000". The upper PC calculator 411 adds the amended upper PC 403 "29'h00000001" and the upper 29 bits "29'h1fffffff" of the PC relative value and updates the lower PC 404 to the resulting addition value "29'h00000000".

As described above, the present calculation method can calculate addresses without needing to calculate the lower bits, so that the speed for calculating addresses can be improved.

Sixth Embodiment

The sixth embodiment of the present invention relates to a linear calculation method for addresses. Unlike the other embodiments, this linear calculation method calculates instruction addresses without splitting the calculation into an upper 29 bits and lower 3 bits.

The following explains the present method for finding the address of a branch destination instruction from the address of a branch instruction and a PC relative value. While the processor that uses the carry method is equipped with an upper PC calculator 411 for calculating the upper 29 bits and a lower PC calculator 405 for calculating the lower 3 bits, a processor that uses the present linear calculation method is only equipped with one PC calculator for calculating a 32-bit address. The PC calculator in this linear calculation method adds a 32-bit address of a branch instruction and a 32-bit PC relative value. This calculation is a normal binary addition.

The addition result of the PC calculator is set as the address of the branch destination instruction. This means that the lower 3 bits of the addition result are set in the lower PC 404 and the upper 29 bits of the addition result are set in the upper PC 403.

The following explains the calculation of the PC relative value by the optimization apparatus 303, assembler 305, and linker 307, which is to say, the subtraction of the address of the branch instruction from the address of the branch destination instruction. Like the processor in this embodiment, the optimization apparatus 303, assembler 305, and linker 307 are each provided with only one calculator, the address subtraction means, for calculating a 32-bit address. The address subtraction means in this linear calculation method subtracts the address of a branch instruction from the address of a branch destination instruction. This calculation is a normal binary subtraction. The subtraction result is then set as the PC relative value.

FIG. 33 shows the object code that has been generated using the linear calculation method of the present embodiment. In FIG. 33, the PC relative values in instructions 2706 and 2713 differ to those shown in FIG. 26. The following describes the method for calculating the PC relative value for instruction 2706.

The address subtraction means in the linear calculation method subtracts the 32-bit address "32'h00000000" of instruction 2701 from the 32-bit address "32'h0000000a" of instruction 2706 and so obtains the address difference "32'hffffffff6".

The relocation information resolving means 713 judges that the address difference "32'hffffffff6" can be expressed by just its lower 13 bits "13'h1ff6", and so replaces the label with "13'h1ff6" as the PC relative value to generate instruction 2706.

The processor 309 executes the object code generated as described above. When executing a branch instruction, the processor 309 adds the upper PC 403 and lower PC 404 that have been amended to indicate the address of the branch instruction to the PC relative value using the present linear calculation method.

When the processor 309 executes instruction 2706 in the object code shown in FIG. 33, the PC calculator in this embodiment adds a 32-bit PC value "32'h0000000a", which has the amended value of the upper PC 403 as the upper 29 bits and the amended value of the lower PC 404 as the lower 3 bits, to the PC relative value "32'hffffffff6" and so obtains the addition result "32'h00000000". After this, the PC calculator updates the lower PC 404 to the lower 3 bits "3'b000" of this addition value, and the upper PC 403 to the upper 29 bits "29'h00000000" of this addition value.

In this way, the present linear calculation method can calculate addresses using a standard calculator as the PC calculator. This simplifies the structure of the processor.

Seventh Embodiment

The seventh embodiment of the present invention relates to a processor that interprets and executes PC adding instructions and PC subtracting instructions and to a compiler that generates such instructions.

Figure 34:
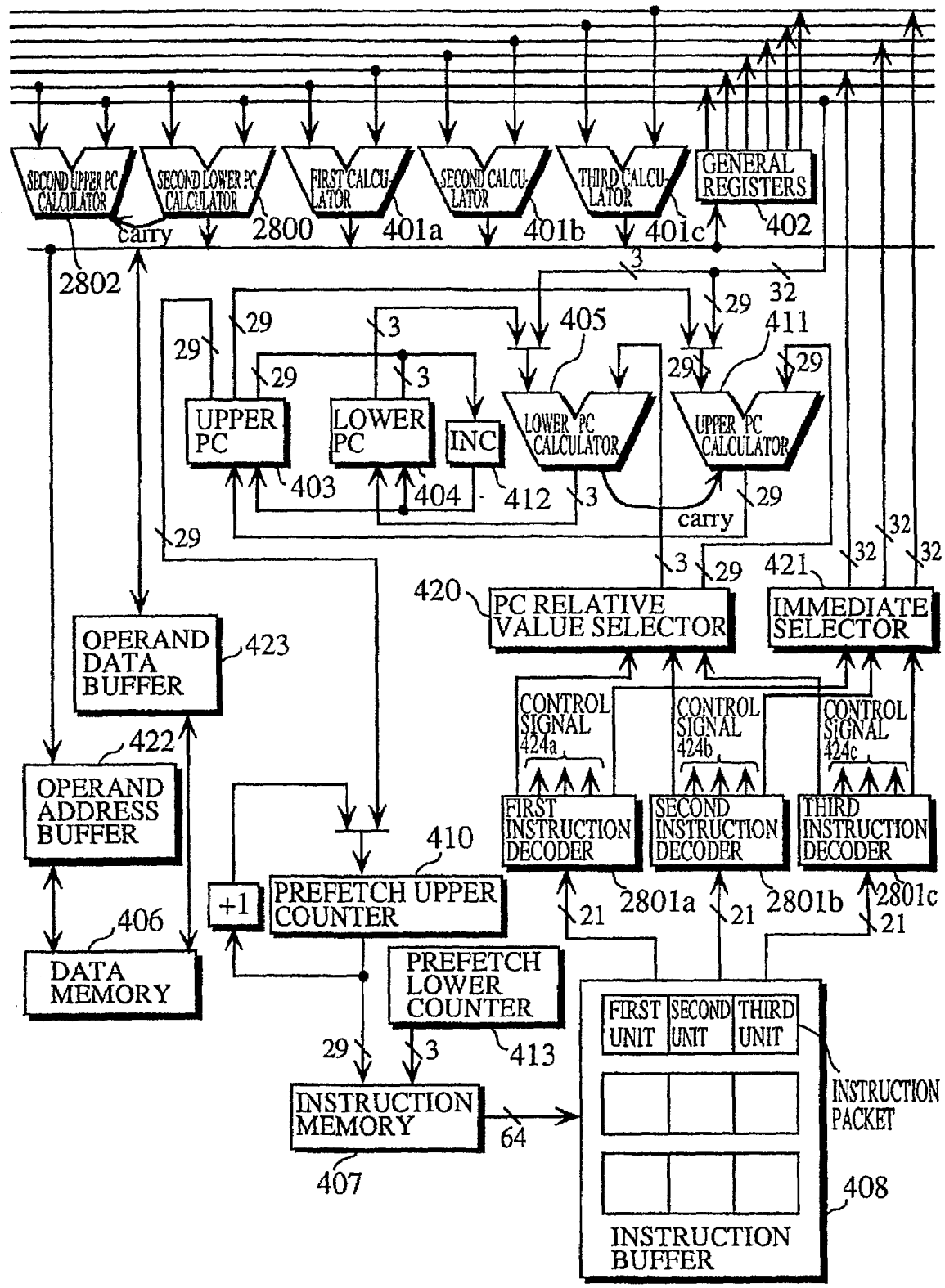
FIG. 34 shows the processor of the seventh embodiment.

FIG. 34 shows the processor of the present embodiment. The processor of the present embodiment differs from the processor in the first embodiment in that it further includes a second lower PC calculator 2800 and a second upper PC calculator 2802 and in that the first instruction decoder 2801a, the second instruction decoder 2801b, and the third instruction decoder 2801c are all provided with new functions.

The instruction decoders 2801a~2801c are provided with an extra function for decoding PC adding instructions and PC subtracting instructions. FIG. 35A shows the operation that corresponds to a PC adding instruction which is shown in mnemonic form. As shown in FIG. 35A, a PC adding instruction adds a PC relative value "disp" to the value of the PC that is stored in a register and stores the addition result in the same register. FIG. 35B shows the operation that corresponds to a PC subtracting instruction which is shown in mnemonic form. As shown in FIG. 35B, a PC adding instruction subtracts a PC relative value "disp" from the value of the PC that is stored in a register and stores the subtraction result in the same register.

The second lower PC calculator 2800 and the second upper PC calculator 2802 perform the PC adding instruction and PC subtraction instruction described above, using the same calculation rules as the lower PC calculator 405 and the upper PC calculator 411 described in the first embodiment.

Figure 36:
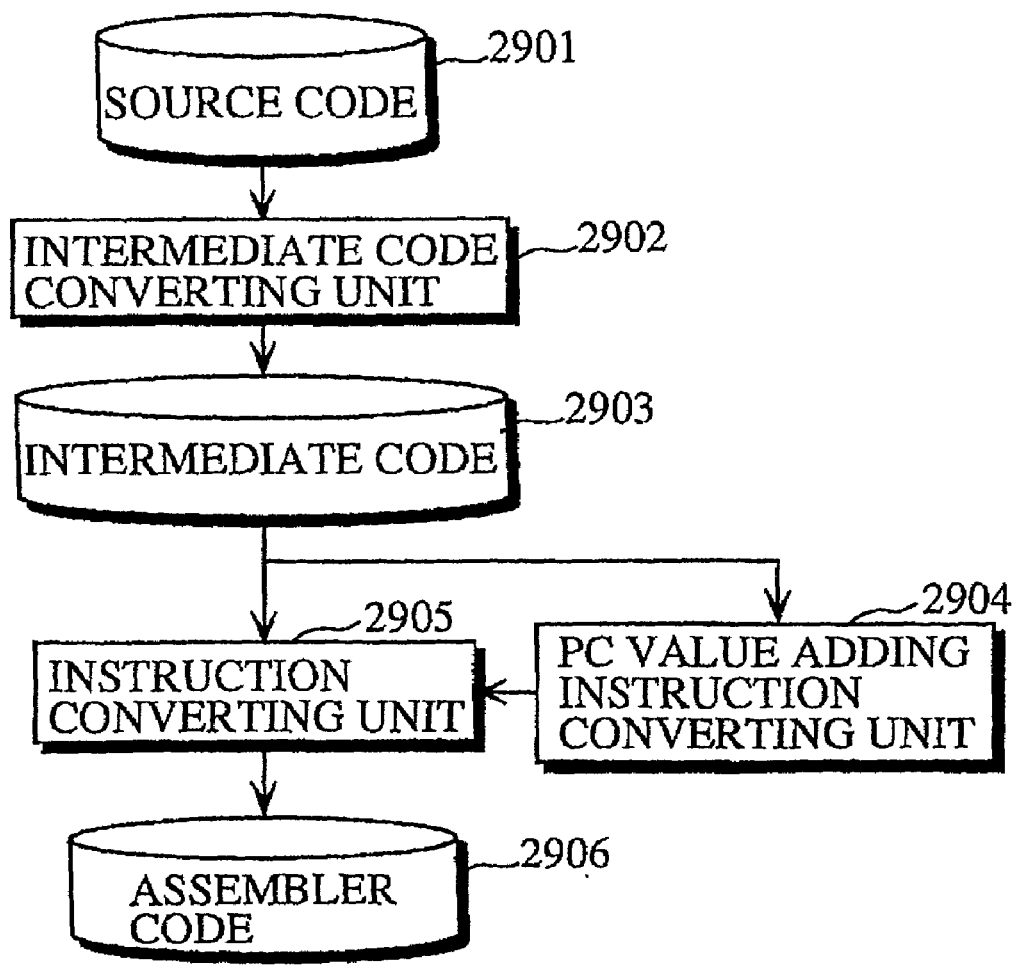
FIG. 36 shows the construction of the compiler of the eighth embodiment of the present invention.

FIG. 36 shows the construction of the compiler of the present embodiment.

The source code 2901 is a program written in a high-level language such as C.

The intermediate code converting unit 2902 converts the source code 2901 into intermediate code 2903 which is an internal expression for the compiler. This intermediate code converting unit 2902 is a well-known technology and so will not be described.

The PC value adding instruction converting unit 2904 converts each intermediate code in the intermediate code 2903 that adds a value of the PC and a variable into an assembler code 2906 for a PC adding instruction that is shown in FIG. 34.

The instruction converting unit 2905 converts the other intermediate codes into assembler code 2906. This instruction converting unit 2905 is a well-known technology and so will not be described.

Figure 37:
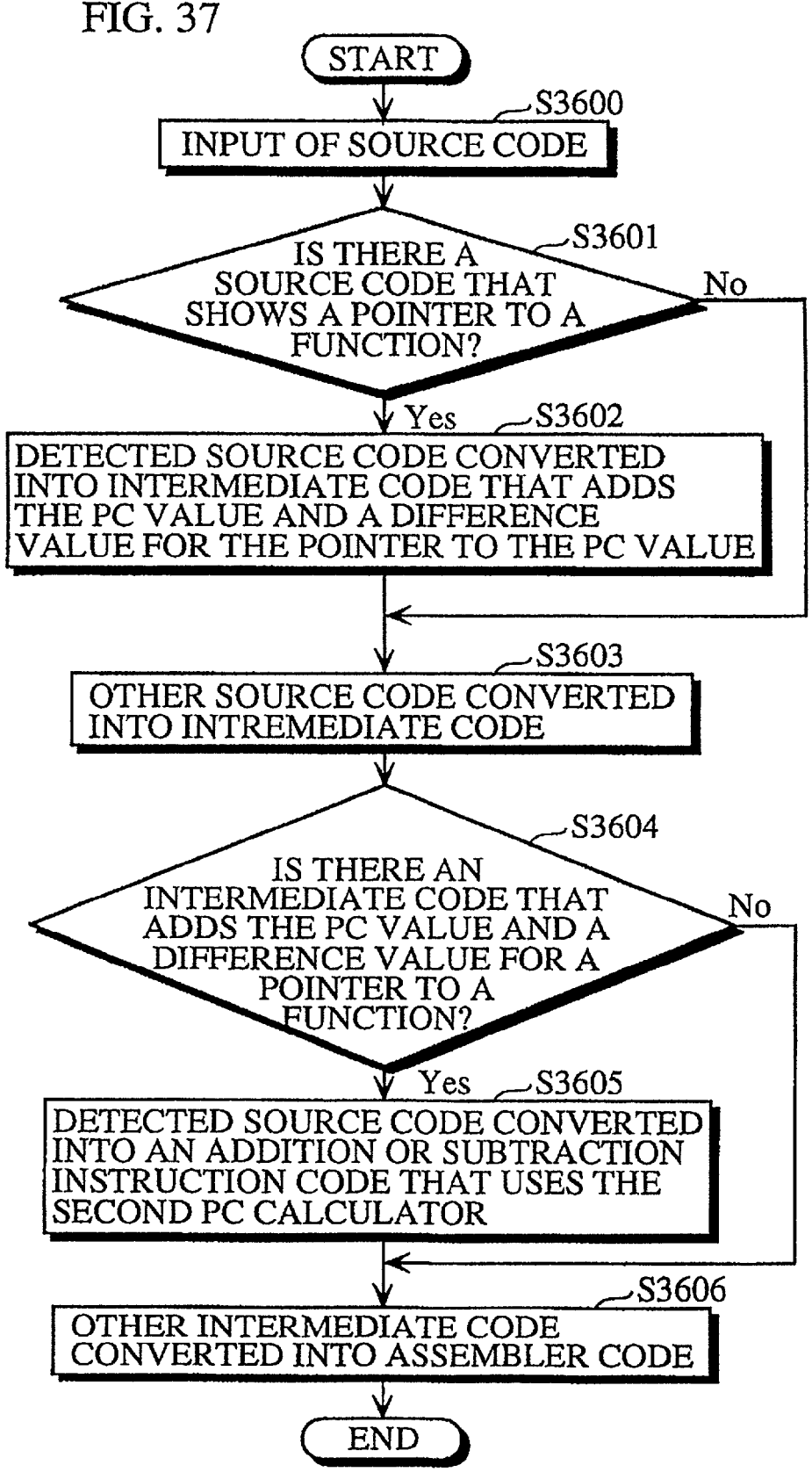
FIG. 37 is a flowchart showing the operation of the compiler.

The following describes a specific example of the operation of the present compiler. FIG. 37 is a flowchart showing the operation of this compiler.

First, the compiler receives an input of source code. FIG. 38 shows source code which is written in C language. In FIG. 38, the external functions g1, g2, g3, and g4 are declared, and the function f is defined as a function that receives the int-type variable "i". This function f includes code that substitutes the address of function g1 into the pointer fp if the value of "i" is 1, substitutes the address of function g2 into the pointer fp if the value of "i" is 2, substitutes the address of function g3 into the pointer fp if the value of "i" is 3, substitutes the address of function g4 into the pointer fp if the value of "i" is 4, and finally calls the function indicated by the pointer fp (step 3600).

Next, the intermediate code converting unit 2902 converts the source code into intermediate codes. When doing so, the intermediate code converting unit 2902 coverts (a) a source code that substitutes a pointer to an external function into a pointer variable into (b) an intermediate code that adds the difference between the address of the start of present function and the address of the start of the external function to a temporary variable that stores the address of the start of the present function, and substitutes the addition result into the pointer variable.

FIG. 39 shows the intermediate codes that have been generated from the source program shown in FIG. 38. The intermediate code 3201 shown in FIG. 39 is an intermediate code that has the label f marking the start of the function and that substitutes the present value of the PC, which is to say, the first address of function f, into the temporary variable tmp. The intermediate code 3202 is intermediate code that judges whether the value of variable i is not "1". The intermediate code 3203 is an intermediate code that branches to the label L when the judgement by intermediate code 3203 is true, that is, variable i is not "1". The intermediate code 3204 is executed when variable i is "1", and adds a difference, obtained by subtracting a first address of function f from the first address of function g1, to the temporary variable tmp into which the first address of function f has been substituted, and has the addition result substituted into the variable fp. The intermediate code 3205 is an intermediate code that branches to the label L.

The intermediate code 3206 includes the label L1, and is an intermediate code that judges whether variable i is not equal to "2". The intermediate code 3207 branches to label L2 when the judgement in intermediate code 3206 is true, which is to say, when variable i is not "2". The intermediate code 3208 is executed when variable i is equal to "2", and is an intermediate code that adds a difference, obtained by subtracting a first address of function f from the first address of function g2, to the temporary variable tmp into which the first address of function f has been substituted, and has the addition result substituted into the variable fp. The intermediate code 3209 is an intermediate code that branches to the label L.

The intermediate code 3210 includes the label L2, and is an intermediate code that judges whether variable i is not equal to "3". The intermediate code 3211 branches to label L3 when the judgement in intermediate code 3210 is true, which is to say, when variable i is not "3". The intermediate code 3212 is executed when variable i is equal to "3", and is an intermediate code that adds a difference, obtained by subtracting a first address of function f from the first address of function g3, to the temporary variable tmp into which the first address of function f has been substituted, and has the addition result substituted into the variable fp. The intermediate code 3213 is an intermediate code that branches to the label L.

The intermediate code 3214 includes the label L4, and is an intermediate code that adds a difference, obtained by subtracting a first address of function f from the first address of function g4, to the temporary variable tmp into which the first address of function f has been substituted, and has the addition result substituted into the variable fp. The intermediate code 3215 includes the label L and is an intermediate code that calls the function indicated by the variable fp.

As described above, the intermediate codes in FIG. 39 do not simply substitute the absolute address of the function g1, g2, g3 or g4 into the variable fp, but instead add a difference between the first address of function f and the first address of one of the functions g1, g2, g3, and g4 to the first address of the function f and substitute the addition result into the variable fp (steps S3601~S3603).

Next, the PC value adding instruction converting unit 2904 converts the intermediate codes into assembler code. The PC value adding instruction converting unit 2904 searches for intermediate codes that add the value of the PC to a PC relative value and converts such codes into assembler code that uses the second lower PC calculator 2800 and the second upper PC calculator 2802. The instruction converting unit 2905 then converts the remaining intermediate codes into assembler code.

The PC value adding instruction converting unit 2904 ascertains that the operand tmp in intermediate code 3204 in FIG. 39 has been set at the value of the PC by the intermediate code 3201 and that the operator "+" indicates an addition of the value of the PC and a PC relative value, and so converts intermediate code 3204 into the assembler code addpc that performs an addition using the second lower PC calculator 2800 and the second upper PC calculator 2802. In the same way, the PC value adding instruction converting unit 2904 converts intermediate codes 3208, 3212, and 3214 into assembler codes addpc. The other intermediate codes in FIG. 39 are converted into assembler codes by the instruction converting unit 2905.

FIG. 40 shows the assembler code that has been produced by converting the intermediate codes shown in FIG. 39. In FIG. 40, the assembler code 3301 has the label f marking the start of a function and is an instruction that transfers the value of the PC into register r1. The assembler code 2802 is an instruction that judges whether the constant "1" and the value of register r0 are not equal. The assembler code 3303 is an instruction that branches to label L1 when the judgement in assembler code 2802 is true. The assembler code 3304 has the second lower PC calculator 2800 and the second upper PC calculator 2802 add the PC relative value that is the difference between the first address of function g1 and the first address of function f to the value of the PC which is the first address of function f and is stored in the register r1, and has the result transferred into register r1. The assembler code 3305 is an instruction that branches to the label L.

The assembler code 3306 has the label L1 and is an instruction that judges whether the constant "2" and the value of register r0 are not equal. The assembler code 3307 is an instruction that branches to label L2 when the judgement in assembler code 3306 is true. The assembler code 3308 has the second lower PC calculator 2800 and the second upper PC calculator 2802 add the PC relative value that is the difference between the first address of function g2 and the first address of function f to the value of the PC which is the first address of function f and is stored in the register r1, and has the result transferred into register r1. The assembler code 3309 is an instruction that branches to the label L.

The assembler code 3310 has the label L2 and is an instruction that judges whether the constant "3" and the value of register r0 are not equal. The assembler code 3311 is an instruction that branches to label L3 when the judgement in assembler code 3310 is true. The assembler code 3311 has the second lower PC calculator 2800 and the second upper PC calculator 2802 add the PC relative value that is the difference between the first address of function g3 and the first address of function f to the value of the PC which is the first address of function f and is stored in the register r1, and has the result transferred into register r1. The assembler code 3313 is an instruction that branches to the label L.

The assembler code 3314 has the label L3 and is an instruction that has the second lower PC calculator 2800 and the second upper PC calculator 2802 add the PC relative value that is the difference between the first address of function g4 and the first address of function f to the value of the PC which is the first address of function f and is stored in the register r1, and has the result transferred into register r1. The assembler code 3315 has the label L and is an instruction that calls the function indicated by register r1. The assembler code 3316 is an instruction that ends the function.

As described above, when there is a source code in function f that substitutes a pointer to the external function g into a pointer variable, the present compiler does not generate an instruction (such as "mov r1,g") that transfers the address of the external function g into register r1, but instead generates an instruction (addpc g–f, r1 ) that has adds a difference (g–f) in addresses between function f and function g to the address of function f that is stored in register r1, and has the result transferred into register r1. Since the value of the PC relative value g–f is smaller that the absolute address g, the overall code size of programs can be reduced by using such addpc instructions. This has a further benefit for PIC codes where the addresses of a program in memory are determined when the program is executed, since calculation instructions that use such PC relative values must be used.

In the same way as in the first embodiment, the assembler code produced by the compiler of the present embodiment is converted into object code that can be executed by the processor by an optimization apparatus 303, an assembler 305 and a linker 307. The processor executes the PC adding instruction "addpc g–f,r1 " in the generated object code using the second lower PC calculator 2800 and the second upper PC calculator 2802. In detail, the second lower PC calculator 2800 adds the lower 3 bits of the constant "g–f" and the lower 3 bits of the value stored in register r1 and sends any carry that is generated to the second upper PC calculator 2802. The second upper PC calculator 2802 adds the upper 29 bits of the constant "g–f", the upper 29 bits of the value stored in register r1, and any carry it has received from the second lower PC calculator 2800. A value given by setting the addition result of the second lower PC calculator 2800 as the lower 3 bits and the addition result of the second upper PC calculator 2802 as the upper 29 bits is then set in register r1.

Note that while the instructions shown in FIG. 35A and 35B respectively are an addition and a subtraction of a constant and the value in a register, this need not be the case. An addition and a subtraction of values in registers, or an addition and a subtraction of a value in a register and the PC may equally be used.

The calculation method used by the second lower PC calculator 2800 and the second upper PC calculator 2802 also need not be the carry method used in the first embodiment. Provided the same method is used by the optimization apparatus 303, assembler 305, and linker 307 that generate the object code to be executed by the processor, any of a no-carry method, a linear method, and an absolute value method may be used.

Eighth Embodiment

The eighth embodiment of the present invention relates to a debugger and a disassembler.

Figure 41:
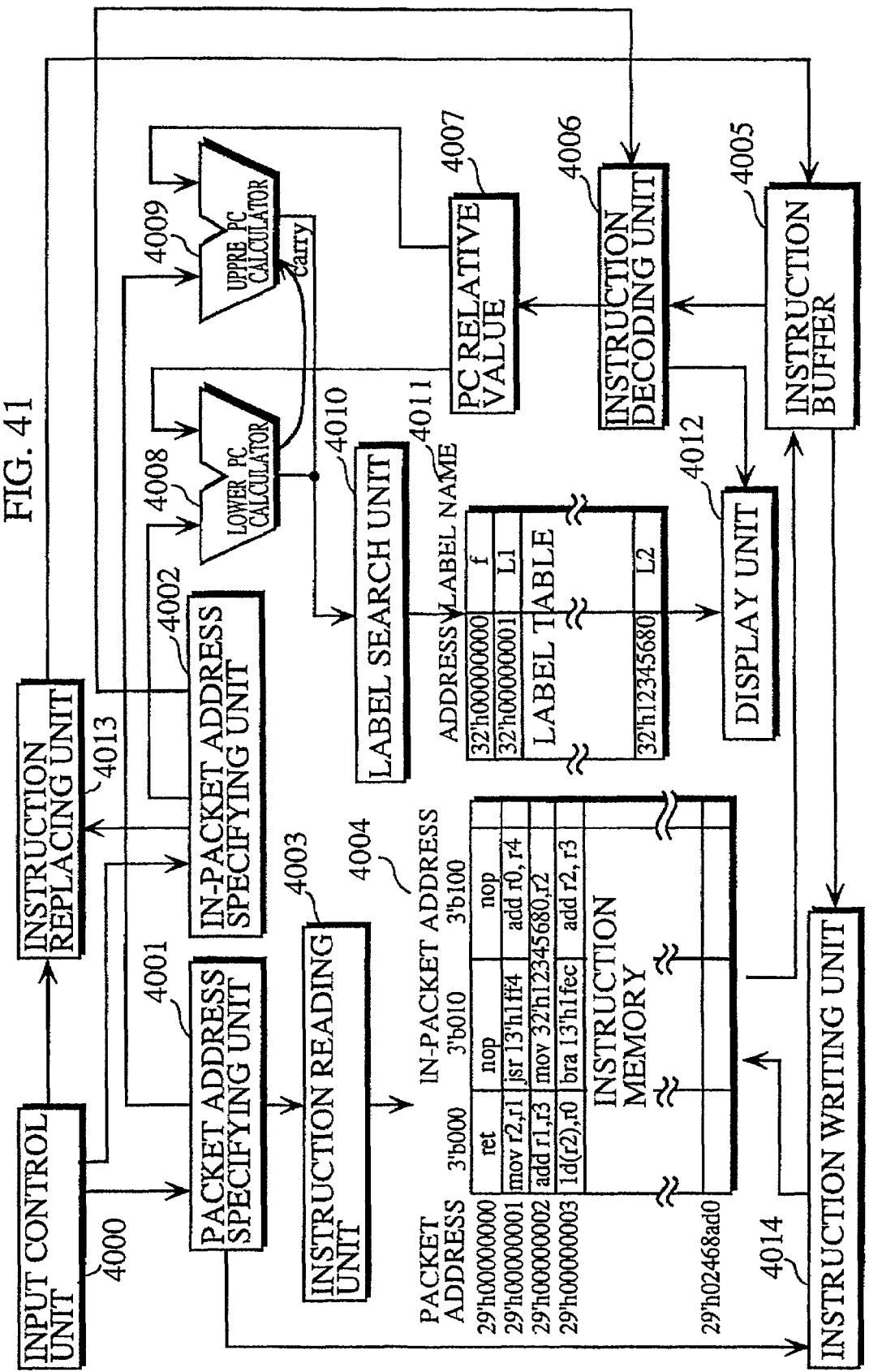
FIG. 41 is a block diagram showing the construction of the debugger and disassembler of the present embodiment.

FIG. 41 is a block diagram showing the construction of the debugger and disassembler of the present embodiment.

The input control unit 4000 receives an input from the user and controls the other components according to this input.

The packet address specifying unit 4001 calculates the upper 29 bits of the address of the inputted instruction.

The in-packet address specifying unit 4002 calculates the lower 3 bits of the address of the inputted instruction.

The instruction memory 4004 stores the instructions to be processed by the debugger and disassembler. As in the first embodiment, the addresses of instructions are 32 bits in length and are composed of a packet address as the upper 29 bits and an in-packet address as the lower 3 bits. FIG. 41 shows how the instructions shown in FIG. 25 are stored.

The instruction reading unit 4003 reads an instruction packet indicated by the packet address specified by the packet address specifying unit 4001 from the instruction memory 4004.

The instruction buffer 4005 stores the instruction packet read from the instruction memory 4004 by the instruction reading unit 4003.

The instruction decoding unit 4006 extracts the instruction unit with the in-packet address specified by the in-packet address specifying unit 4002 from the instruction buffer 4005 and decodes the extracted instruction unit. When the instruction unit is a branch instruction, the instruction decoding unit 4006 sends the PC relative value 4007 to the lower PC calculator 4008 and the upper PC calculator 4009.

The label table 4011 is a table storing each label name associated with a corresponding instruction address. This label table 4011 is generated by extracting information from the optimized code when the assembler described in the first embodiment generates machine language codes.

In FIG. 41, the address "32'h00000000" corresponds to the label f, the address "32'h00000008" corresponds to the label L1 , and the address "32'h12345680" corresponds to the label L2.

The display unit 4012 displays the results of a disassembling of an instruction.

The instruction replacing unit 4013 writes the instruction that has been replaced into the instruction unit(s) in the instruction buffer 4005 that is/are indicated by the in-packet address specified by the in-packet address specifying unit 4002.

The instruction writing unit 4014 rewrites the instruction packet in the instruction memory 4004 with the packet address specified by the packet address specifying unit 4001 using the amended instruction packet stored in the instruction buffer 4005.

The upper PC calculator 4009 performs a calculation on the upper 29 bits of the instruction address specified by the packet address specifying unit 4001 and the upper 29 bits of the PC relative value 4007.

The lower PC calculator 4008 performs a calculation on the lower 3 bits of the instruction address specified by the in-packet address specifying unit 4002 and the lower 3 bits of the PC relative value 4007. The calculation methods used by these PC calculators is the same as that used when generating the object code.

Figure 42:
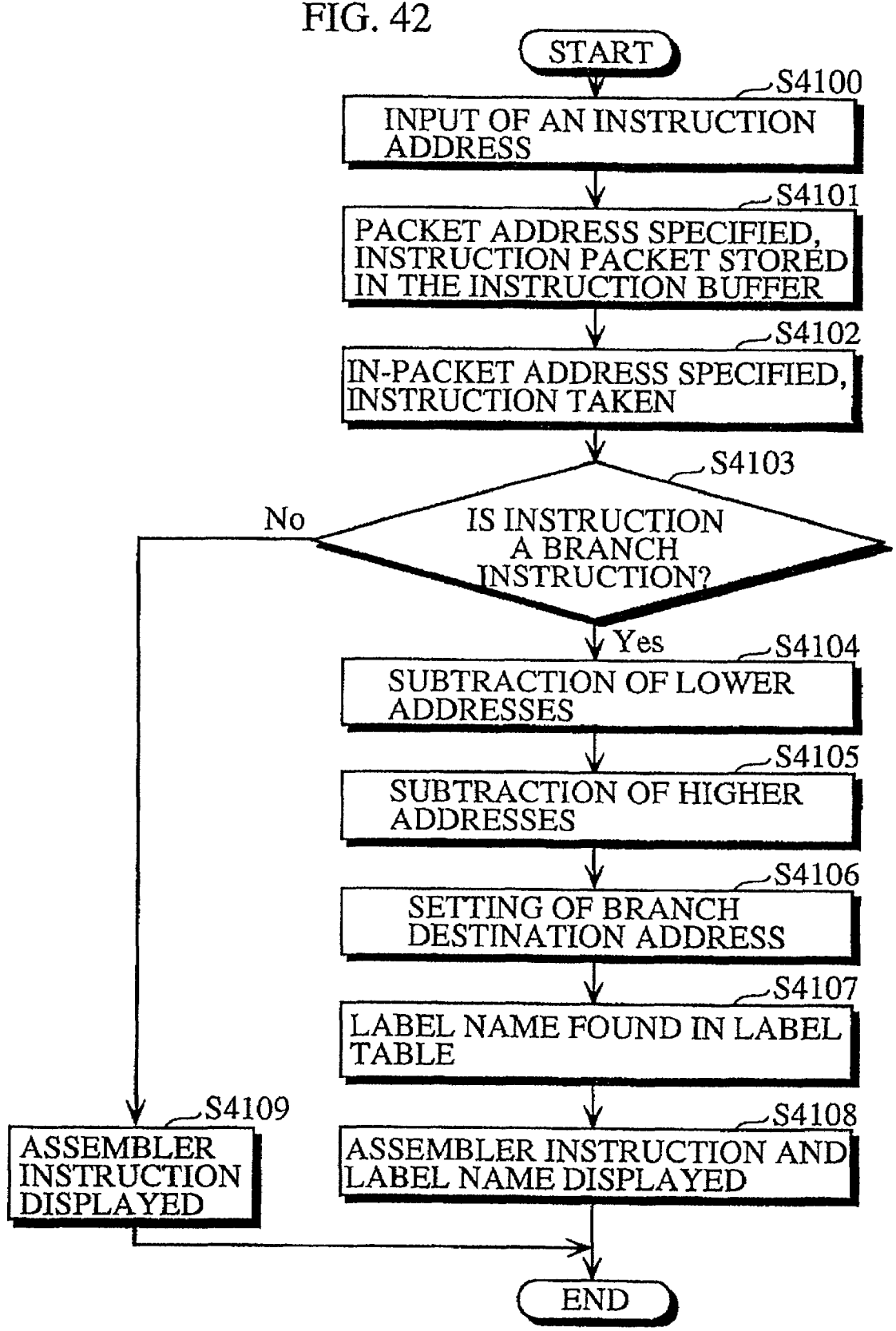
FIG. 42 is a flowchart showing the operating procedure of a disassembler of the present invention.

The following describes a specific example of the operation of the present disassembler. FIG. 42 is a flowchart showing the operating procedure of this disassembler.

First, the input control unit 4000 receives a command indicating the disassembling of an instruction and an input of the address of the instruction to be disassembled. In this specific example, the input control unit 4000 receives "32'h0000001a" as the instruction address (step S4100).

Next, the packet address specifying unit 4001 specifies the packet address from the upper 29 bits of the instruction address. The instruction reading unit 4003 then reads the instruction packet with the specified packet address from the instruction memory 4004 and stores it in the instruction buffer 4005. In this example, "29'h00000003" is specified as the packet address, and the instruction sequence "ld (r2 ),r0| |bra 13'h1fec| |add r2,r3" is stored in the instruction buffer 4005 (step S4101).

The in-packet address specifying unit 4002 then specifies the in-packet address from the lower 3 bits of the instruction address and informs the instruction decoding unit 4006 of the instruction unit that has the specified in-packet address. The instruction decoding unit 4006 then extracts the indicated instruction unit from the instruction buffer 4005. In this example, "13'b010" is specified as the in-packet address and the instruction "bra 13'h1fec" that is the second unit in the instruction buffer 4005 is inputted into the instruction decoding unit 4006 (step S4102).

The instruction decoding unit 4006 judges whether the inputted instruction is a branch instruction. In this example, the inputted instruction "bra 13'h1fec" is a branch instruction, so that this judgement is true (step S4103).

When the instruction is a branch instruction, a calculation is performed on the PC relative value 4007 indicated in the instruction and address of the inputted instruction. The lower PC calculator 4008 performs an addition or a subtraction on the in-packet address of the inputted instruction and on the lower 3 bits of the PC relative value 4007 and sends the calculation result to the label search unit 4010. The upper PC calculator 4009 performs an addition or a subtraction on the packet address of the inputted instruction and on the upper 29 bits of the PC relative value 4007 and sends the calculation result to the label search unit 4010. The label search unit 4010 specifies the address of a label from the calculation result for the upper bits and the calculation result for the lower bits. In this example, the label address "32'h00000008" is specified by a calculation using the address "32'h0000001a" of the inputted instruction and the PC relative value 4007 "13'h1fec" (steps S4103, S4104).

The label search unit 4010 then refers to the label table 4011 and finds the label name that has the specified address. In this example, the label L1 corresponds to the address "32'h00000008" (Step S4107).

The display unit 4012 displays the assembler name of the branch instruction and the label name found by the label search unit 4010. In this example, the display unit 4012 displays the assembler name "bra" of the branch instruction and the corresponding label name "Label L1" (Step S4108).

The instruction decoding unit 4006 has the display unit 4012 display only the assembler name when the extracted instruction is not an assembler instruction (Step S4109).

The following describes a specific example of the operation of the present debugger.

Figure 43:
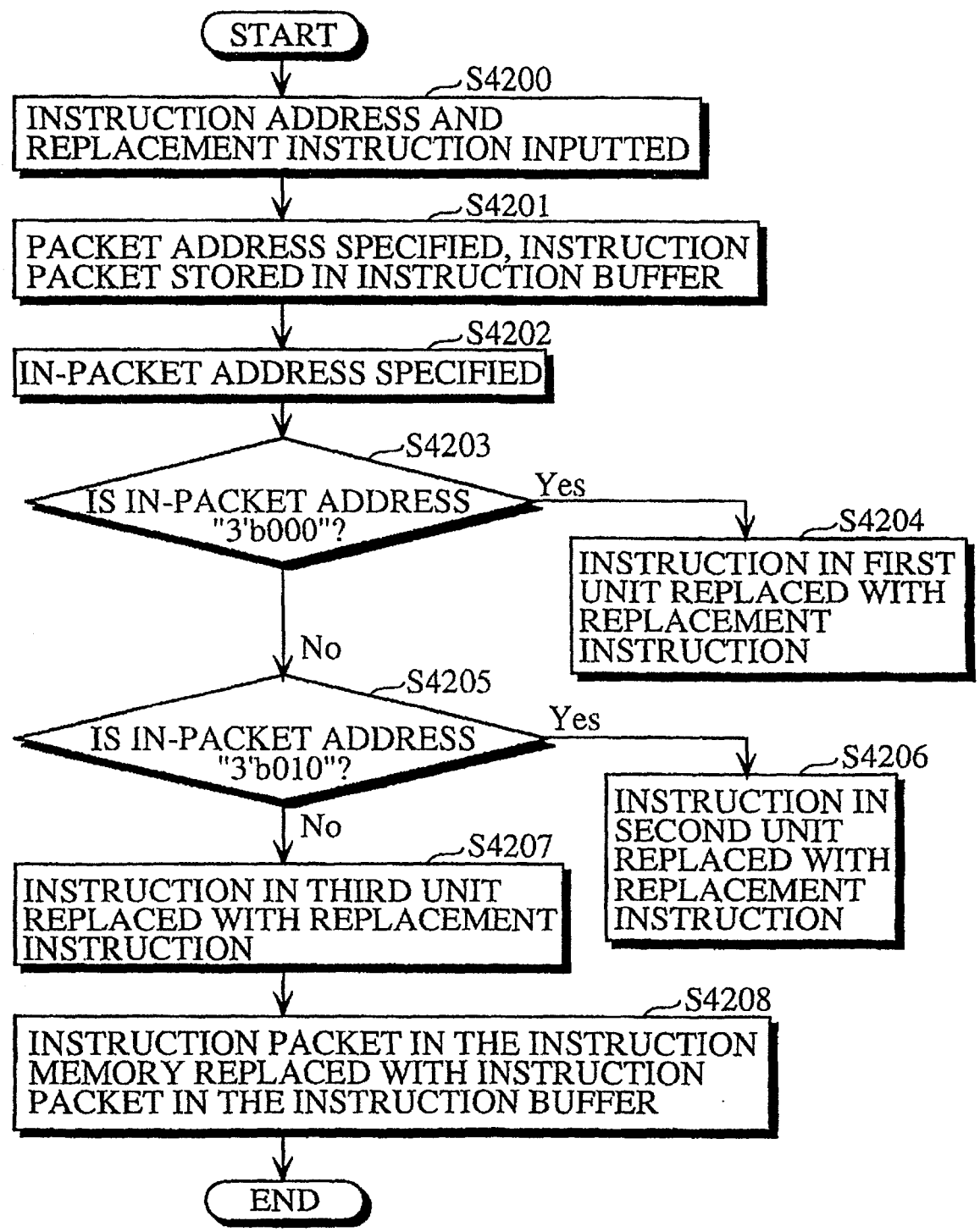
FIG. 43 is a flowchart showing the operation of the debugger of the present invention.

FIG. 43 is a flowchart showing the operation of the present debugger.

First, the input control unit 4000 receives a command indicating the debugging of an instruction, the address of an instruction to be replaced, and the instruction to be used to replace of this instruction. In this specific example, the input control unit 4000 receives "32'h0000001a" as the instruction address and the subtraction instruction "sub r0,r1 " as the replacement instruction (step S4200).

Next, the packet address specifying unit 4001 specifies the packet address from the upper 29 bits of the instruction address. The instruction reading unit 4003 then reads the instruction packet with the specified packet address from the instruction memory 4004 and stores it in the instruction buffer 4005. In this example, "29'h00000003" is specified as the packet address, and the instruction sequence "ld (r2 ),r0| |bra 13'h1fec| |add r2,r3" is stored in the instruction buffer 4005 (step S4201).

The in-packet address specifying unit 4002 then specifies the in-packet address from the lower 3 bits of the instruction address. In this example, the in-packet address "13'b010" is specified (step S4202).

If the specified in-packet address is "3'b000", the first unit in the instruction packet in the instruction buffer 4005 is replaced with the inputted replacement instruction. If the specified in-packet address is "3'b010", the second unit in the instruction packet in the instruction buffer 4005 is replaced with the inputted replacement instruction. If the specified in-packet address is "3'b100", the third unit in the instruction packet in the instruction buffer 4005 is replaced with the inputted replacement instruction. In this example, the specified in-packet address is "3'b010", so that the instruction "bra 13'h1fec" in the second unit in the instruction packet in the instruction buffer 4005 is replaced with the inputted replacement instruction "sub r0,r1 ". As a result, the instruction packet in the instruction buffer 4005 becomes "ld (r2 ),r0| |sub r0,r1 | |add r2,r3" (steps S4203~S4207).

The instruction writing unit 4014 replaces the instruction packet at the indicated packet address in the instruction memory 4004 with the instruction packet stored in the instruction buffer 4005. In this example, the instruction packet "ld (r2 ),r0| |bra 13'h1fec| |add r2,r3" at the packet address "29'h00000003" in the instruction memory 4004 is replaced with the instruction packet "ld (r2 ),r0| |sub r0,r1 | |add r2,r3" in the instruction buffer 4005.

As described above, the disassembler of the present embodiment can disassemble instructions that are executable for the processor 309 of the first embodiment. When an instruction is disassembled, instead of just displaying the PC relative value, the disassembler has the upper PC calculator and lower PC calculator calculate the address at which the label is located, uses the address to search the label table, and so displays the appropriate label name.

The debugger of the present embodiment reads instructions from the memory in units of instruction packets that are byte-aligned, rewrites an instruction in the instruction buffer, and writes the instructions back into the memory in units of instruction packets. This method is suited to the debugging of instructions that are not byte-aligned.

Note that the calculation methods used by the lower PC calculator and the upper PC calculator do not need to be the carry method described in the first embodiment, so that another method, such as a separation method, an absolute value method, or a linear method, can be used.

The compiler, optimization apparatus, assembler, linker, processor, disassembler, and debugger of the present invention have been explained by way of the first to eighth embodiments of the present invention, though it should be obvious that the present invention is not limited to these. Two example modifications are given below.

(1) In the first to sixth embodiments, the assembler code 302, the optimized code 304, the relocatable codes 306, and the object code 308 may be stored in a mask ROM, a semiconductor memory such as flash memory, a magnetic storage medium such as a floppy disk or a hard disk, or an optical disc such as a CD-ROM or DVD.

(2) In the seventh embodiment, the assembler codes 2906 may be stored in a mask ROM, a semiconductor memory such as flash memory, a magnetic storage medium such as a floppy disk or a hard disk, or an optical disc such as a CD-ROM or DVD.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A processor that executes instructions converted by a compiler, comprising:

a fetching unit configured to fetch instruction packets one by one, wherein each instruction packet has fixed bit length and includes a plurality of instructions, wherein each instruction has a boundary information bit, a value of which indicates whether the instruction should be processed together with a succeeding instruction; and an execution unit configured to process an instruction contained in a certain instruction packet and another instruction contained in a succeeding instruction packet in parallel based on the value of the boundary information bit, wherein at least one of the instruction packets includes instructions which are processed sequentially, and wherein the value of the boundary information bit is determined by the compiler during static parallel scheduling.

2. The processor of claim 1, wherein the execution unit is further operable to process the instruction contained in the certain instruction packet and the another instruction contained in the succeeding instruction packet sequentially based on the boundary information.

3. The processor of claim 1, further comprising:

an instruction buffer for temporally storing instructions so as to be executed in a later cycle.

4. The processor of claim 2, wherein the processor is capable of executing a variable number of instructions in parallel.

5. The processor of claim 4, wherein a bit length of instructions which the processor executes in parallel is variable.

* * * * *